US012808991B2

(12) United States Patent
Yoshida

(10) Patent No.: US 12,808,991 B2
(45) Date of Patent: Nov. 24, 2026

(54) DISTANCE MEASURING DEVICE

(71) Applicant: SONY SEMICONDUCTOR SOLUTIONS CORPORATION, Kanagawa (JP)

(72) Inventor: Atsushi Yoshida, Kumamoto (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 733 days.

(21) Appl. No.: 18/255,603

(22) PCT Filed: Nov. 22, 2021

(86) PCT No.: PCT/JP2021/042717
§ 371 (c)(1),
(2) Date: Jun. 2, 2023

(87) PCT Pub. No.: WO2022/124059
PCT Pub. Date: Jun. 16, 2022

(65) Prior Publication Data
US 2024/0103134 A1 Mar. 28, 2024

(30) Foreign Application Priority Data
Dec. 11, 2020 (JP) ................................ 2020-206035

(51) Int. Cl.
*G01C 3/08* (2006.01)
*G01S 7/481* (2006.01)
*G01S 7/4863* (2020.01)

(52) U.S. Cl.
CPC .......... *G01S 7/4813* (2013.01); *G01S 7/4863* (2013.01)

(58) Field of Classification Search
CPC ............................ G01S 7/4813; G01S 7/4863
See application file for complete search history.

(56) References Cited

U.S. PATENT DOCUMENTS

2007/0272882 A1 11/2007 Ishihara et al.
2013/0327931 A1 12/2013 Hsu et al.
2017/0090018 A1 3/2017 Buettgen
2018/0062003 A1* 3/2018 Luan ...................... H10F 77/50
(Continued)

FOREIGN PATENT DOCUMENTS

EP 3620813 A1 * 3/2020 ............ G01S 17/64
JP 2008-003075 1/2008
(Continued)

OTHER PUBLICATIONS

International Search Report and Written Opinion prepared by the Japan Patent Office on Jan. 17, 2022, for International Application No. PCT/JP2021/042717, 2 pgs.

*Primary Examiner* — Mark Hellner
(74) *Attorney, Agent, or Firm* — SHERIDAN ROSS P.C.

(57) ABSTRACT

A distance measuring device according to the present disclosure includes a luminescence element, a light receiving element, and a substrate. The luminescence element irradiates an object (X) with light. The light receiving element receives light from the luminescence element reflected from the object (X). The luminescence element and the light receiving element are mounted on a substrate. In addition, a bonding wire (W) electrically connecting the light receiving element and the substrate is not disposed on an edge of the light receiving element on a side of the luminescence element.

8 Claims, 12 Drawing Sheets

(56) References Cited

U.S. PATENT DOCUMENTS

| | | | | |
|---|---|---|---|---|
| 2020/0003870 | A1 | 1/2020 | Chen | |
| 2021/0373132 | A1* | 12/2021 | Etschmaier | G01S 7/4813 |

FOREIGN PATENT DOCUMENTS

| | | | |
|---|---|---|---|
| JP | 2008124923 | A | 5/2008 |
| JP | 2009-264784 | | 11/2009 |
| JP | 2018-100934 | | 6/2018 |
| JP | 2020-153701 | | 9/2020 |
| WO | WO 2020/246264 | | 12/2020 |

* cited by examiner

DISTANCE MEASURING DEVICE

CROSS REFERENCE TO RELATED APPLICATIONS

This application is a national stage application under 35 U.S.C. 371 and claims the benefit of PCT Application No. PCT/JP2021/042717, having an international filing date of 22 Nov. 2021, which designated the United States, which PCT application claimed the benefit of Japanese Patent Application No. 2020-206035, filed 11 Dec. 2020, the entire disclosures of each of which are incorporated herein by reference.

FIELD

The present disclosure relates to a distance measuring device.

BACKGROUND

As one of distance measuring methods for measuring a distance to an object using light, a distance measuring method called a time of flight (ToF) method is known. In such a ToF method, reflection light obtained by light emitted from a light source being reflected by an object is received by a light receiving element, and a distance to the object is measured based on a time from when the light is emitted until when the light is received as the reflection light (see, for example, Patent Literature 1).

CITATION LIST

Patent Literature

Patent Literature 1: JP 2020-153701 A

SUMMARY

Technical Problem

The present disclosure proposes a distance measuring device capable of receiving reference light in a favorable state by a light receiving element.

Solution to Problem

According to the present disclosure, there is provided a distance measuring device. The distance measuring device includes a luminescence element, a light receiving element, and a substrate. The luminescence element irradiates an object with light. The light receiving element receives light from the luminescence element reflected from the object. The luminescence element and the light receiving element are mounted on a substrate. In addition, a bonding wire electrically connecting the light receiving element and the substrate is not disposed on an edge of the light receiving element on a side of the luminescence element.

DESCRIPTION OF EMBODIMENTS

Figure 1:
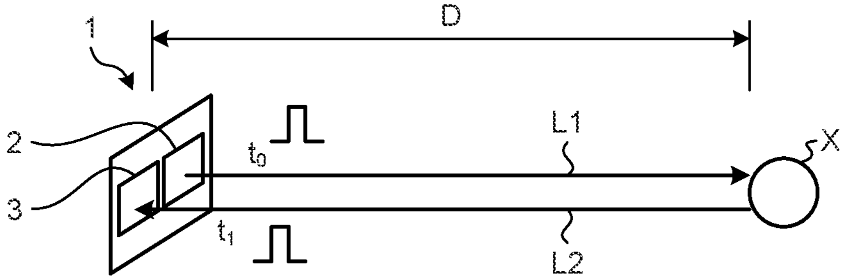
FIG. 1 is a diagram schematically illustrating distance measurement by a direct ToF method applicable to an embodiment of the present disclosure.

Hereinafter, embodiments of the present disclosure will be described in detail with reference to the drawings. Note that, in each of the following embodiments, the same parts are denoted by the same reference numerals, and redundant description will be omitted.

As one of distance measuring methods for measuring a distance to an object using light, a distance measuring method called a ToF method is known. In such a direct ToF method, reflection light obtained by light emitted from a light source being reflected by an object is received by a light receiving element, and a distance to the object is measured based on a time from when the light is emitted until when the light is received as the reflection light.

In addition, in the distance measuring device to which such a distance measuring technique is applied, a part of the light emitted from the luminescence element (hereinafter, also referred to as reference light) is guided to the light receiving element in the device. Thus, the time when the light is emitted can be accurately evaluated.

On the other hand, in a case where the reference light is irregularly reflected by various members (for example, a bonding wire or the like) inside the device, the reference light does not reach the light receiving element in a favorable state, and thus there is a possibility that the emission time cannot be accurately evaluated using the reference light.

Therefore, it is expected to overcome the above-described problems and realize a distance measuring device capable of receiving reference light in a favorable state by a light receiving element.

[Distance Measurement Method]

The present disclosure relates to a technique for performing distance measurement using light. Therefore, in order to facilitate understanding of the embodiment of the present disclosure, a distance measurement method applicable to the embodiment will be described with reference to FIGS. 1 and 2.

FIG. 1 is a diagram schematically illustrating distance measurement by a direct ToF method applicable to an embodiment of the present disclosure. In the present disclosure, the direct ToF method is applied as the distance measurement method.

The direct ToF method is a method in which reflection light L2 obtained by emission light L1 from a luminescence element 2 being reflected by an object X is received by a light receiving element 3, and the distance is measured based on the time of the difference between the light emission timing and the light reception timing.

A distance measuring device 1 includes the luminescence element 2 and the light receiving element 3. The luminescence element 2 has a light source, for example, a laser diode, and is driven to produce laser light in a pulsed manner.

The emission light L1 from the luminescence element 2 is reflected by the object X and received by the light receiving element 3 as the reflection light L2. The light receiving element 3 includes a pixel array unit 10 (see FIG. 4) that converts light into an electric signal by photoelectric conversion, and outputs a signal corresponding to the received light.

Here, the time (luminescence timing) at which the luminescence element 2 produces luminescence is time to, and the time (light reception timing) at which the light receiving element 3 receives the reflection light L2 obtained by reflecting the emission light L1 from the luminescence element 2 by the object X is time $t_1$.

Assuming that a constant c is a light velocity ($2.9979\times10^8$ [m/sec]), a distance D between the distance measuring device 1 and the object X is calculated by the following equation (1).

$$D=(c/2)\times(t_1-t_0) \quad (1)$$

Note that the distance measuring device 1 may repeatedly execute the above-described processing a plurality of times. In addition, the light receiving element 3 may include a plurality of effective pixels 10*a* (see FIG. 5), and may calculate the distance D based on each light reception timing at which the reflection light L2 is received by each effective pixel 10*a*.

The distance measuring device 1 classifies time t m (hereinafter, also referred to as a "light reception time $t_m$") from the time to of the luminescence timing to the light reception timing at which the light is received by the light receiving element 3 based on a class (bin (bins)) and generates a histogram.

Figure 2:
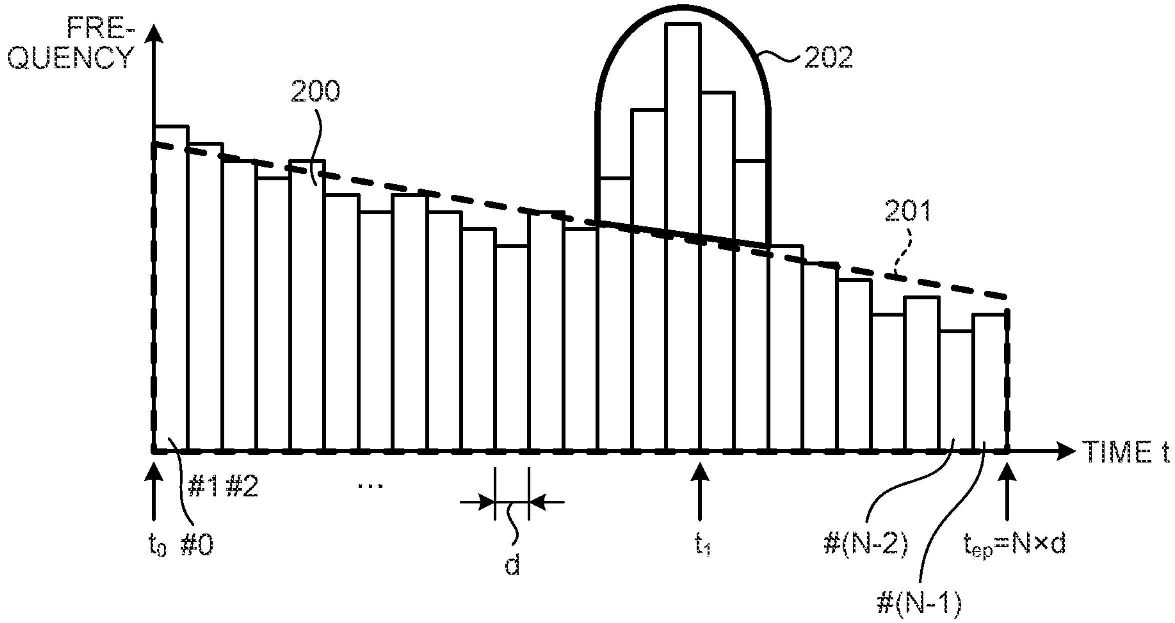
FIG. 2 is a diagram illustrating an example of a histogram based on a time at which a light receiving unit applicable to the embodiment of the present disclosure receives light.

FIG. 2 is a diagram illustrating an example of a histogram based on a time at which the light receiving element 3 applicable to the embodiment of the present disclosure receives light. In FIG. 2, the horizontal axis indicates a bin, and the vertical axis indicates a frequency for each bin. The bin is obtained by classifying the light reception time t m for each predetermined unit time d.

Specifically, bin #0 is $0\le t_m<d$, bin #1 is $d\le t_m<2\times d$, bin #2 is $2\times d\le t_m<3\times d$, . . . , bin #(N−2) is $(N-2)\times d\le t_m<(N-1)\times d$. In a case where the exposure time of the light receiving element 3 is time $t_{ep}$, $t_{ep}=N\times d$.

The distance measuring device 1 counts the number of times of acquiring the light reception time t m based on the bin, obtains the frequency 200 for each bin, and generates a histogram. Here, the light receiving element 3 also receives light other than the reflection light L2 obtained by reflecting the emission light L1 from the luminescence element 2.

For example, as an example of light other than the target reflection light L2, there is ambient light around the distance measuring device 1. The ambient light is light that randomly enters the light receiving element 3, and an ambient light component 201 due to the ambient light in the histogram is noise with respect to the target reflection light L2.

On the other hand, the target reflection light L2 is light received according to a specific distance, and appears as an active light component 202 in the histogram. The bin corresponding to the frequency of the peak in the active light component 202 is the bin corresponding to the distance D of the object X.

By acquiring the representative time of the bin (for example, the time at the center of the bin) as the above time $t_1$, the distance measuring device 1 can calculate the distance D to the object X according to the above-described equation (1). In this way, by using the plurality of light reception results, appropriate distance measurement can be executed for random noise.

[Configuration of Distance Measuring Device]

Figure 3:
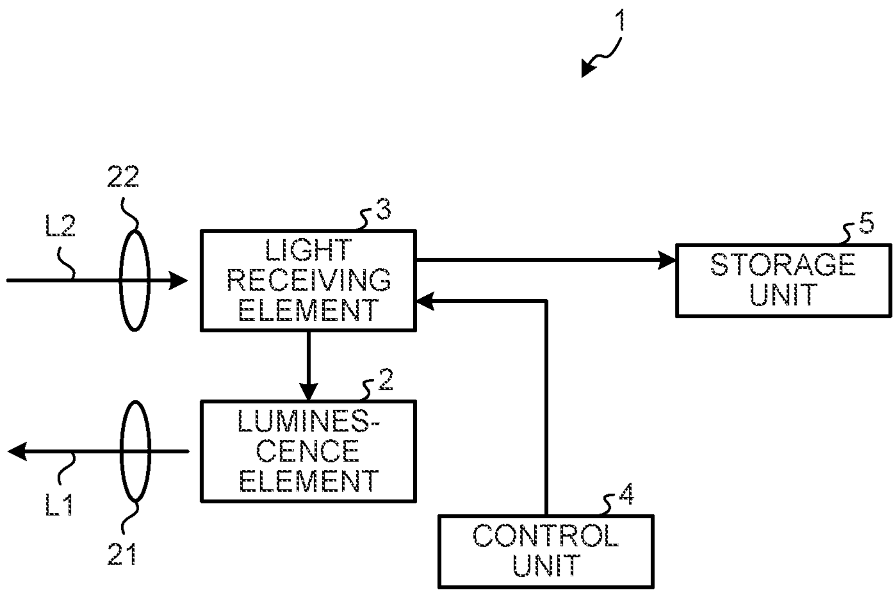
FIG. 3 is a block diagram illustrating an example of a configuration of a distance measuring device according to the embodiment.

Next, a detailed configuration of the distance measuring device 1 according to the embodiment will be described with reference to FIGS. 3 to 6. FIG. 3 is a block diagram illustrating an example of a configuration of the distance measuring device 1 according to the embodiment. As illustrated in FIG. 3, the distance measuring device 1 includes the luminescence element 2, the light receiving element 3, a control unit 4, a storage unit 5, a first lens 21, and a second lens 22.

The luminescence element 2 is, for example, a laser diode, and is driven to emit laser light in a pulsed manner. For example, a vertical cavity surface emitting laser (VCSEL) that emits laser light as a surface light source can be applied to the luminescence element 2.

Note that a configuration may be applied to the luminescence element 2 in which an array in which laser diodes are arranged on a line is used, and laser light emitted from the laser diode array is scanned in a direction perpendicular to the line. In addition, a configuration in which a laser diode as a single light source is used and a laser light emitted from the laser diode is scanned horizontally and vertically may be applied to the luminescence element 2.

The light receiving element 3 includes, for example, the pixel array unit 10 (see FIG. 4) having effective pixels 10*a* (see FIG. 4) arranged in a two-dimensional lattice pattern. The first lens 21 guides the emission light L1 from the luminescence element 2 to the outside. The second lens 22 guides light incident from the outside to the light receiving element 3.

The control unit 4 controls the entire operation of the distance measuring device 1. For example, the control unit 4 supplies a light emission trigger, which is a trigger for causing the luminescence element 2 to produce luminescence, to the luminescence element 2. The luminescence element 2 causes the laser diode to emit light at the timing based on the luminescence trigger, and stores the time to indicating the luminescence timing. In addition, the control unit 4 sets a pattern at the time of distance measurement for the light receiving element 3 in response to an instruction from the outside, for example.

The light receiving element 3 counts the number of times of acquiring time information (light reception time $t_m$) indicating the timing at which light is received on the light receiving surface within a predetermined time range, obtains the frequency for each bin, and generates the above-described histogram. The light receiving element 3 further calculates the distance D to the object X based on the generated histogram. Information indicating the calculated distance D is stored in the storage unit 5.

Figure 4:
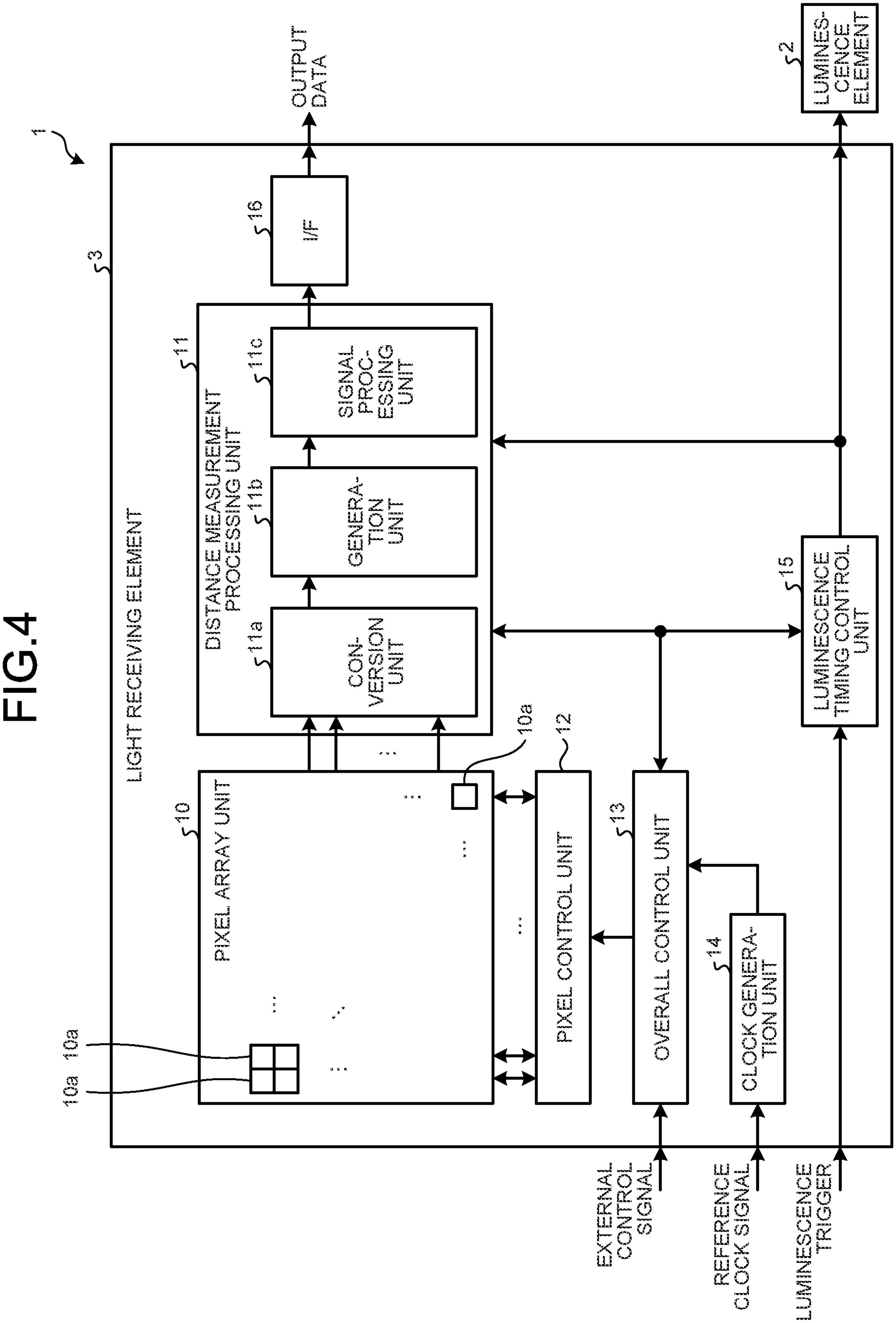
FIG. 4 is a block diagram illustrating a configuration of an example of a light receiving element applicable to the embodiment in more detail.

FIG. 4 is a block diagram illustrating a configuration of an example of the light receiving element 3 applicable to the embodiment in more detail. In FIG. 4, the light receiving element 3 includes the pixel array unit 10, a distance measurement processing unit 11, a pixel control unit 12, an overall control unit 13, a clock generation unit 14, a luminescence timing control unit 15, and an interface (I/F) 16.

The pixel array unit 10, the distance measurement processing unit 11, the pixel control unit 12, the overall control unit 13, the clock generation unit 14, the luminescence timing control unit 15, and the interface 16 are arranged on one semiconductor chip, for example.

In FIG. 4, the overall control unit 13 controls the overall operation of the light receiving element 3 according to, for example, a program incorporated in advance. In addition, the overall control unit 13 can also execute control according to an external control signal supplied from the outside.

The clock generation unit 14 generates one or more clock signals used in the light receiving element 3 based on a reference clock signal supplied from the outside. The luminescence timing control unit 15 generates a luminescence control signal indicating a luminescence timing according to a luminescence trigger signal supplied from the outside. The luminescence control signal is supplied to the luminescence element 2 and also supplied to the distance measurement processing unit 11.

The pixel array unit 10 includes a plurality of effective pixels 10*a* each having a photodiode 10*a*1 (see FIG. 5) arranged in a two-dimensional lattice pattern. The operation of each effective pixel 10*a* is controlled by the pixel control unit 12 according to an instruction of the overall control unit 13.

For example, the pixel control unit 12 can control reading of the pixel signal from each effective pixel 10*a* for each block including (p×q) effective pixels 10*a* of p pixels in the row direction and q pixels in the column direction. In addition, the pixel control unit 12 can scan each effective pixel 10*a* in the row direction and further scan in the column direction in units of the block, and read the pixel signal from each effective pixel 10*a*.

The present invention is not limited to this, and the pixel control unit 12 can independently control each effective pixel 10*a*. Furthermore, the pixel control unit 12 can set a predetermined region of the pixel array unit 10 as a target region, and set an effective pixel 10*a* included in the target region as an effective pixel 10*a* from which a pixel signal is read.

The pixel signal read from each effective pixel 10*a* is supplied to the distance measurement processing unit 11. The distance measurement processing unit 11 includes a conversion unit 11*a*, a generation unit 11*b*, and a signal processing unit 11*c*.

The pixel signal read from each effective pixel 10*a* and output from the pixel array unit 10 is supplied to the conversion unit 11*a*. Here, the pixel signal is asynchronously read from each effective pixel 10*a* and supplied to the conversion unit 11*a*. That is, the pixel signal is read from the photodiode 10*a*1 and output according to the timing at which light is received in each effective pixel 10*a*.

The conversion unit 11*a* converts the pixel signal supplied from the pixel array unit 10 into digital information. That is, the pixel signal supplied from the pixel array unit 10 is output corresponding to the timing at which the light is received by the photodiode 10*a*1 included in the effective pixel 10*a* corresponding to the pixel signal. The conversion unit 11*a* converts the supplied pixel signal into time information indicating the timing.

The generation unit 11*b* generates a histogram based on the time information obtained by converting the pixel signal by the conversion unit 11*a*. Here, the generation unit 11*b* counts the time information based on the unit time d (see FIG. 2) set by the control unit 4 (see FIG. 3) or the like, and generates a histogram.

The signal processing unit 11*c* performs predetermined calculation processing based on the data of the histogram generated by the generation unit 11*b*, and calculates, for example, distance information. For example, the signal processing unit 11*c* creates curve approximation of the histogram based on the data of the histogram generated by the generation unit 11*b*. The signal processing unit 11*c* can detect a peak of a curve approximated by the histogram and obtain the distance D based on the detected peak.

When curve approximation of the histogram is performed, the signal processing unit 11*c* can perform filter processing on the curve to which the histogram is approximated. For example, the signal processing unit 11*c* can suppress a noise component by performing low-pass filter processing on a curve of which histogram is approximated.

The distance information obtained by the signal processing unit 11*c* is supplied to the interface 16. The interface 16 outputs the distance information supplied from the signal processing unit 11$c$ to the outside as output data. For example, a mobile industry processor interface (MIPI) can be applied as the interface 16.

Note that, in the above-described configuration, the distance information obtained by the signal processing unit 11$c$ is output to the outside via the interface 16, but this is not limited to this example. That is, histogram data that is the data of the histogram generated by the generation unit 11$b$ may be output from the interface 16 to the outside.

In this case, as the distance measurement condition information set by the control unit 4 or the like, information indicating a filter coefficient can be omitted. The histogram data output from the interface 16 is supplied to, for example, an external information processing device and processed as appropriate.

In addition, in the above-described configuration, an example has been described in which the distance measurement processing unit 11 that performs the distance measurement processing is provided inside the light receiving element 3, but the distance measurement processing unit 11 may be provided outside the light receiving element 3.

Figure 5:
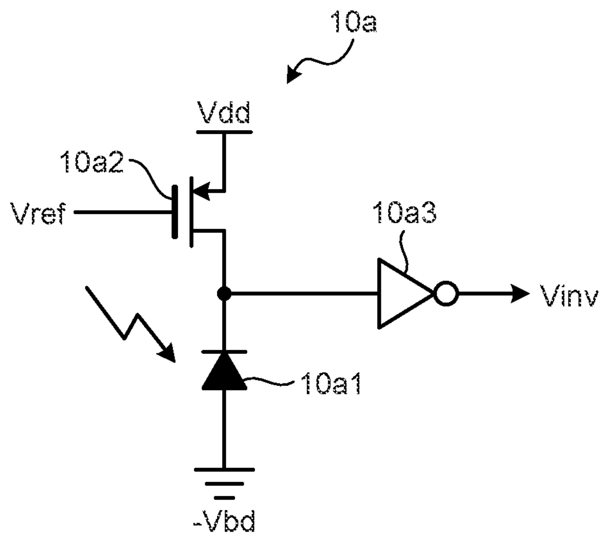
FIG. 5 is a diagram illustrating a basic configuration example of an effective pixel applicable to the embodiment of the present disclosure.

FIG. 5 is a diagram illustrating a basic configuration example of the effective pixel 10$a$ applicable to the embodiment of the present disclosure. As illustrated in FIG. 5, the effective pixel 10$a$ includes the photodiode 10$al$, a transistor 10$a$2, and an inverter 10$a$3.

The photodiode 10$a$1 converts the incident light into an electric signal by photoelectric conversion and outputs the electric signal. In the embodiment, the photodiode 10$a$1 converts an incident photon (photon) into an electric signal by photoelectric conversion, and outputs a pulse according to incidence of the photon.

In the embodiment, a single photon avalanche diode is used as the photodiode 10$al$. Hereinafter, the single photon avalanche diode is referred to as a single photon avalanche diode (SPAD).

The SPAD has a characteristic that when a large negative voltage that generates avalanche multiplication is applied to the cathode, electrons generated in response to incidence of one photon generate avalanche multiplication, and a large current flows. By utilizing this characteristic of the SPAD, incidence of one photon can be detected with high sensitivity.

In FIG. 5, the photodiode 10$a$1 that is the SPAD has a cathode connected to the drain of the transistor 10$a$2 and an anode connected to a voltage source of voltage (−Vbd).

The transistor 10$a$2 has a source connected to power source voltage Vdd, and a gate to which reference voltage Vref is input. As a result, the transistor 10$a$2 functions as a current source capable of outputting a current according to the power source voltage Vdd and the reference voltage Vref from the drain.

With such a configuration, a reverse bias is applied to the photodiode 10$al$. In addition, the photocurrent flows in a direction from the cathode toward the anode of the photodiode 10$al$.

A signal extracted from a connection point between the drain of the transistor 10$a$2 and the cathode of the photodiode 10$a$1 is input to the inverter 10$a$3. The inverter 10$a$3 performs, for example, threshold determination on the input signal, inverts the signal every time the signal exceeds the threshold in the positive direction or the negative direction, and outputs the inverted signal as an output signal Vinv.

Note that the photodiode 10$a$1 is not limited to the SPAD. An avalanche photodiode (APD) or a normal photodiode can be applied as the photodiode 10$a$1.

Figure 6:
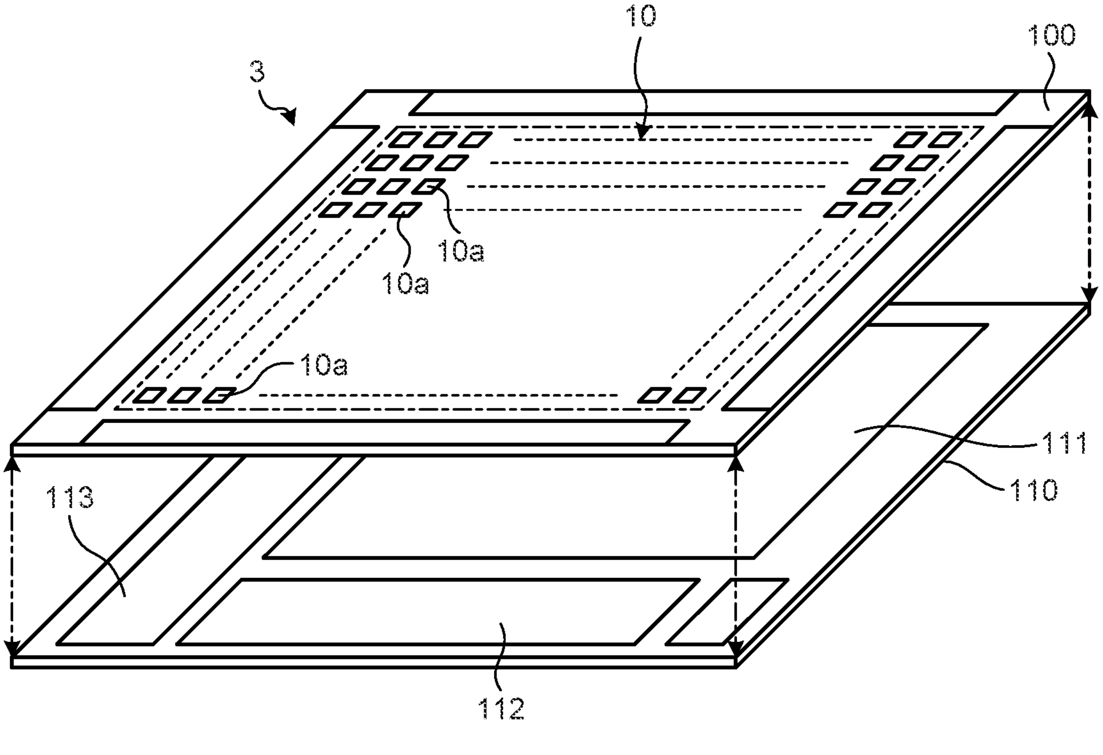
FIG. 6 is a schematic diagram illustrating an example of a configuration of a device applicable to the light receiving element according to the embodiment of the present disclosure.

FIG. 6 is a schematic diagram illustrating an example of a configuration of a device applicable to the light receiving element 3 according to the embodiment. In FIG. 6, the light receiving element 3 is configured by stacking a light receiving chip 100 including a semiconductor chip and a logic chip 110. Note that, in FIG. 6, for the sake of explanation, the light receiving chip 100 and the logic chip 110 are illustrated in a separated state.

In the light receiving chip 100, photodiodes 10$a$1 (see FIG. 5) included in each of the plurality of effective pixels 10$a$ are arranged in a two-dimensional lattice pattern in a region of the pixel array unit 10. In addition, in the effective pixel 10$a$, the transistor 10$a$2 and the inverter 10$a$3 are formed on the logic chip 110.

Both ends of the photodiode 10$a$1 are connected between the light receiving chip 100 and the logic chip 110 via a coupling portion such as a copper-copper connection (CCC).

The logic chip 110 includes a logic array unit 111 including a signal processing unit that processes a signal acquired by the effective pixel 10$a$. The logic chip 110 further includes a signal processing circuit unit 112 that is close to the logic array unit 111 and processes the signal acquired by the effective pixel 10$a$, and an element control unit 113 that controls the operation as the light receiving element 3.

For example, the signal processing circuit unit 112 includes the distance measurement processing unit 11 illustrated in FIG. 4. In addition, the element control unit 113 includes the pixel control unit 12, the overall control unit 13, the clock generation unit 14, the luminescence timing control unit 15, and the interface 16 illustrated in FIG. 4.

Note that the configurations on the light receiving chip 100 and the logic chip 110 are not limited to this example. In addition to the control of the logic array unit 111, the element control unit 113 can be disposed, for example, in the vicinity of the effective pixel 10$a$ for the purpose of other drive or control. In addition to the arrangement illustrated in FIG. 6, the element control unit 113 can be provided in an arbitrary region of the light receiving chip 100 and the logic chip 110 to have an arbitrary function.

[Module Configuration of Distance Measuring Device]

Figure 7:
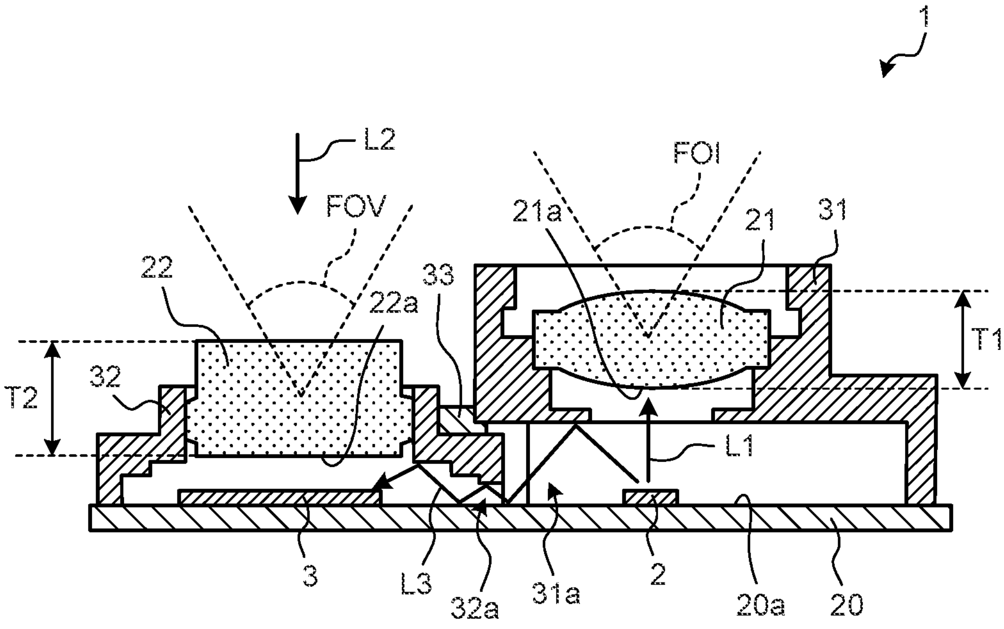
FIG. 7 is a cross-sectional view illustrating an example of a configuration of the distance measuring device according to the embodiment of the present disclosure.
Figure 8:
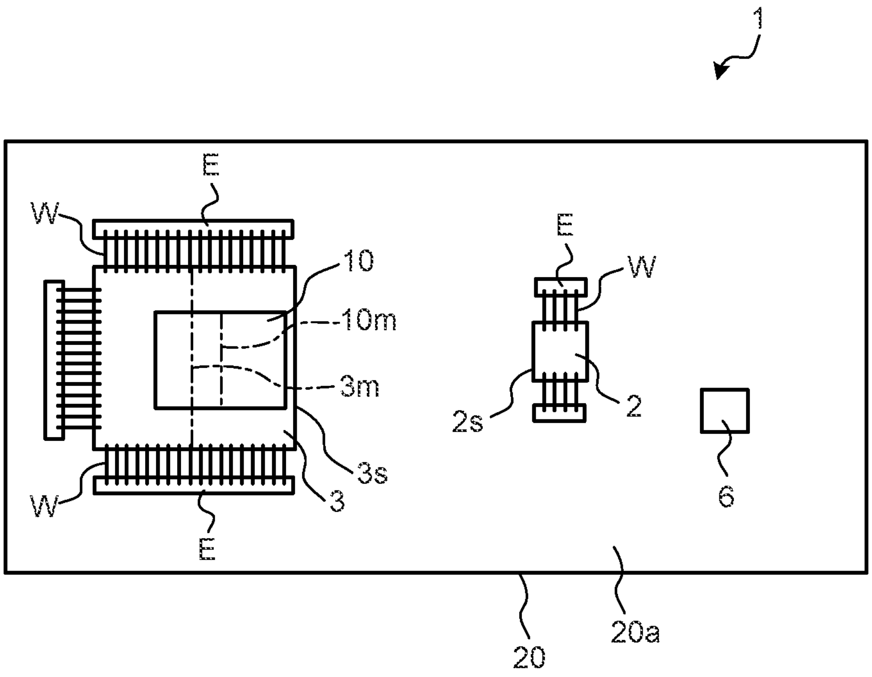
FIG. 8 is a plan view illustrating a configuration example of the distance measuring device according to the embodiment of the present disclosure.

Next, a module configuration of the distance measuring device 1 according to the embodiment will be described with reference to FIGS. 7 to 11. FIG. 7 is a cross-sectional view illustrating an example of a configuration of the distance measuring device 1 according to the embodiment of the present disclosure, and FIG. 8 is a plan view illustrating a configuration example of the distance measuring device 1 according to the embodiment of the present disclosure. Note that FIG. 8 illustrates an example of arrangement of each member on a front surface 20$a$ of a substrate 20.

As illustrated in FIG. 7, the distance measuring device 1 according to the embodiment includes the luminescence element 2, a light receiving element 3, a mounting component 6 (see FIG. 8), the substrate 20, the first lens 21, the second lens 22, a first housing 31, and a second housing 32.

The mounting component 6 includes components other than the luminescence element 2 and the light receiving element 3 in the distance measuring device 1. The mounting component 6 is, for example, a passive element such as a resistor, a capacitor, or an inductor, or an active element such as a transistor or a diode. Note that, in the example of FIG. 8, one mounting component 6 is mounted, but a plurality of mounting components 6 may be mounted on the substrate 20.

The substrate 20 has a plate shape, and the luminescence element 2, the light receiving element 3, and the mounting component 6 are mounted on the front surface 20*a*. The substrate 20 is, for example, a rigid substrate or a ceramic substrate.

In addition, the substrate 20 is provided with circuit patterns (not illustrated) for configuring various circuits inside the distance measuring device 1, and the circuit patterns are electrically connected to plurality of electrodes E arranged on the front surface 20*a*. Then, the electrode E and the luminescence element 2 or the light receiving element 3 are electrically connected by a plurality of bonding wires W.

The first lens 21 is disposed on the optical axis of the luminescence element 2 to be focused on the luminescence element 2 on the substrate 20. In addition, the first lens 21 has a given irradiation range FOI (field of illumination).

Then, in the distance measuring device 1, by causing the emission light L1 from the luminescence element 2 to pass through the first lens 21, the irradiation range FOI can be irradiated with the emission light L1. Note that, in the exemplary embodiment, the first lens 21 may include one lens or plural lenses.

The second lens 22 is arranged on the optical axis of the light receiving element 3 to be focused on the pixel array unit 10 (see FIG. 8) of the light receiving element 3 on the substrate 20. In addition, the second lens 22 has a given visual field range FOV (field of view).

Then, in the distance measuring device 1, the reflection light L2 from the object X (see FIG. 1) is passed through the second lens 22, in a manner that the light receiving element 3 can receive the reflection light L2 from the visual field range FOV. Note that, in the exemplary embodiment, the second lens 22 may include one lens or plural lenses.

In addition, in the embodiment, the irradiation range FOI of the first lens 21 is preferably set to be substantially equal to or slightly larger than the visual field range FOV of the second lens 22. As a result, since the entire visual field range FOV can be irradiated with the emission light L1, the reflection light L2 can be received from the entire visual field range FOV.

The first housing 31 is disposed on the front surface 20*a* of the substrate 20 to cover the luminescence element 2, and supports the first lens 21 on the optical axis of the luminescence element 2. The first housing 31 is made of, for example, a resin material having a light shielding property, a metal material having a light shielding property, or the like.

The second housing 32 is disposed on the front surface 20*a* of the substrate 20 to cover the light receiving element 3, and supports the second lens 22 on the optical axis of the light receiving element 3. The second housing 32 is made of, for example, a resin material having a light shielding property, a metal material having a light shielding property, or the like.

In addition, an opening portion 31*a* is formed in a region between the luminescence element 2 and the light receiving element 3 in the first housing 31, and an opening portion 32*a* is formed in a region between the luminescence element 2 and the light receiving element 3 in the second housing 32.

Then, the distance measuring device 1 is configured in a manner that reference light L3, which is a part of the emission light L1 emitted from the luminescence element 2, is incident on the pixel array unit 10 of the light receiving element 3 through the opening portion 31*a* and the opening portion 32*a*.

Then, the distance measuring device 1 can accurately evaluate the time to (see FIG. 1), which is the time at which the luminescence element 2 emits light, by measuring the time at which the reference light L3 is incident on the light receiving element 3. Therefore, according to the embodiment, the distance D to the object X can be accurately measured.

In addition, a resin material 33 having a light shielding property may be disposed between the first housing 31 and the second housing 32. As a result, light other than the reference light L3 can be prevented from leaking into the light receiving element 3 through the opening portion 32*a*. Therefore, according to the embodiment, the quality of the reference light L3 incident on the light receiving element 3 can be favorably maintained.

Then, in the embodiment, as illustrated in FIG. 8, the bonding wire W is not disposed on an edge 3*s* of the light receiving element 3 on the side of the luminescence element 2, and the bonding wire W electrically connecting the light receiving element 3 and the substrate 20 is preferably disposed on an edge different from the edge 3*s* of the light receiving element 3.

As described above, since the bonding wire W is not disposed on the edge 3*s* of the light receiving element 3 on the side of the luminescence element 2, when the reference light L3 emitted from the luminescence element 2 travels toward the light receiving element 3, irregular reflection by the bonding wire W can be suppressed.

Therefore, according to the embodiment, the reference light L3 in a favorable state can be received by the light receiving element 3. Furthermore, in the embodiment, the bonding wire W is disposed on the edge different from the edge 3*s* in the light receiving element 3, in a manner that the light receiving element 3 and the substrate 20 can be favorably electrically connected.

In addition, in the embodiment, since the bonding wire W is not disposed on the edge 3*s* of the light receiving element 3 on the side of the luminescence element 2, the luminescence element 2 and the light receiving element 3 can be brought close to each other, in a manner that the base line length between the luminescence element 2 and the light receiving element 3 can be shortened.

Therefore, according to the embodiment, since the parallax between the luminescence element 2 and the light receiving element 3 can be reduced, the distance D to the object X can be accurately obtained.

In addition, in the embodiment, as illustrated in FIG. 8, the bonding wire W is not disposed on an edge 2*s* of the luminescence element 2 on the side of the light receiving element 3, and the bonding wire W electrically connecting the luminescence element 2 and the substrate 20 is preferably disposed on an edge different from the edge 2*s* of the luminescence element 2.

As described above, since the bonding wire W is not disposed on the edge 2*s* of the luminescence element 2 on the side of the light receiving element 3, when the reference light L3 emitted from the luminescence element 2 travels toward the light receiving element 3, irregular reflection by the bonding wire W can be suppressed.

Therefore, according to the embodiment, the reference light L3 in a favorable state can be received by the light receiving element 3. Furthermore, in the embodiment, the bonding wire W is disposed on the edge different from the edge 2*s* in the luminescence element 2, in a manner that the luminescence element 2 and the substrate 20 can be favorably electrically connected.

In addition, in the embodiment, since the bonding wire W is not disposed on the edge 2*s* of the luminescence element 2 on the side of the light receiving element 3, the luminescence element 2 and the light receiving element 3 can be brought close to each other, in a manner that the base line length between the luminescence element 2 and the light receiving element 3 can be shortened.

Therefore, according to the embodiment, since the parallax between the luminescence element 2 and the light receiving element 3 can be reduced, the distance D to the object X can be accurately obtained.

In addition, in the embodiment, as illustrated in FIG. 8, the mounting component 6 is not disposed in the region between the luminescence element 2 and the light receiving element 3, and the mounting component 6 is preferably disposed in a region other than the region between the luminescence element 2 and the light receiving element 3.

As a result, when the reference light L3 emitted from the luminescence element 2 travels toward the light receiving element 3, irregular reflection by the mounting component 6 can be suppressed. Therefore, according to the embodiment, the reference light L3 in a favorable state can be received by the light receiving element 3.

In addition, in the embodiment, since the mounting component 6 is not disposed in the region between the luminescence element 2 and the light receiving element 3, the luminescence element 2 and the light receiving element 3 can be brought close to each other, in a manner that the base line length between the luminescence element 2 and the light receiving element 3 can be shortened.

Therefore, according to the embodiment, since the parallax between the luminescence element 2 and the light receiving element 3 can be reduced, the distance D to the object X can be accurately obtained.

In addition, in the embodiment, the thinner one of the first lens 21 and the second lens 22 is preferably disposed farther from the substrate 20 than the thicker one. For example, as illustrated in FIG. 7, in a case where thickness T1 of the first lens 21 is thinner than thickness T2 of the second lens 22, a lower end portion 21*a* of the first lens 21 is preferably disposed farther from the substrate 20 than a lower end portion 22*a* of the second lens 22.

As a result, since the irradiation range FOI of the thinner first lens 21 can be lifted as a whole, even in a case where the base line length between the luminescence element 2 and the light receiving element 3 is shortened, vignetting can be prevented from occurring in the irradiation range FOI by the second housing 32. That is, in the embodiment, the base line length between the luminescence element 2 and the light receiving element 3 can be shortened.

Therefore, according to the embodiment, since the parallax between the luminescence element 2 and the light receiving element 3 can be reduced, the distance D to the object X can be accurately obtained.

On the other hand, in a case where thickness T2 of the second lens 22 is thinner than thickness T1 of the first lens 21, the lower end portion 22*a* of the second lens 22 is preferably disposed farther from the substrate 20 than the lower end portion 21*a* of the first lens 21.

As a result, since the visual field range FOV of the thinner second lens 22 can be lifted as a whole, even in a case where the base line length between the luminescence element 2 and the light receiving element 3 is shortened, vignetting can be prevented from occurring in the visual field range FOV by the first housing 31. That is, in the embodiment, the base line length between the luminescence element 2 and the light receiving element 3 can be shortened.

Therefore, according to the embodiment, since the parallax between the luminescence element 2 and the light receiving element 3 can be reduced, the distance D to the object X can be accurately obtained.

In addition, in the embodiment, as illustrated in FIG. 7, the first housing 31 and the second housing 32 may be disposed to partially overlap each other in a plan view. For example, in the embodiment, one of the first housing 31 and the second housing 32 (the first housing 31 in FIG. 7) may have a structure capable of housing a part of the other housing (the second housing 32 in FIG. 7) as a nest.

As a result, the first lens 21 and the second lens 22 can be brought close to each other in a plan view, in a manner that the base line length between the luminescence element 2 and the light receiving element 3 can be shortened.

Therefore, according to the embodiment, since the parallax between the luminescence element 2 and the light receiving element 3 can be reduced, the distance D to the object X can be accurately obtained.

In addition, in the embodiment, as illustrated in FIG. 8, a center line 10*m* of the pixel array unit 10 provided in the light receiving element 3 is preferably positioned closer to the luminescence element 2 than a center line 3*m* of the light receiving element 3. That is, in the embodiment, in the light receiving element 3, the pixel array unit 10 may be disposed to be close to the side of the luminescence element 2.

As a result, the luminescence element 2 and the pixel array unit 10 of the light receiving element 3 can be brought close to each other, in a manner that the base line length between the luminescence element 2 and the light receiving element 3 can be shortened. Therefore, according to the embodiment, since the parallax between the luminescence element 2 and the light receiving element 3 can be reduced, the distance D to the object X can be accurately obtained.

Figure 9:
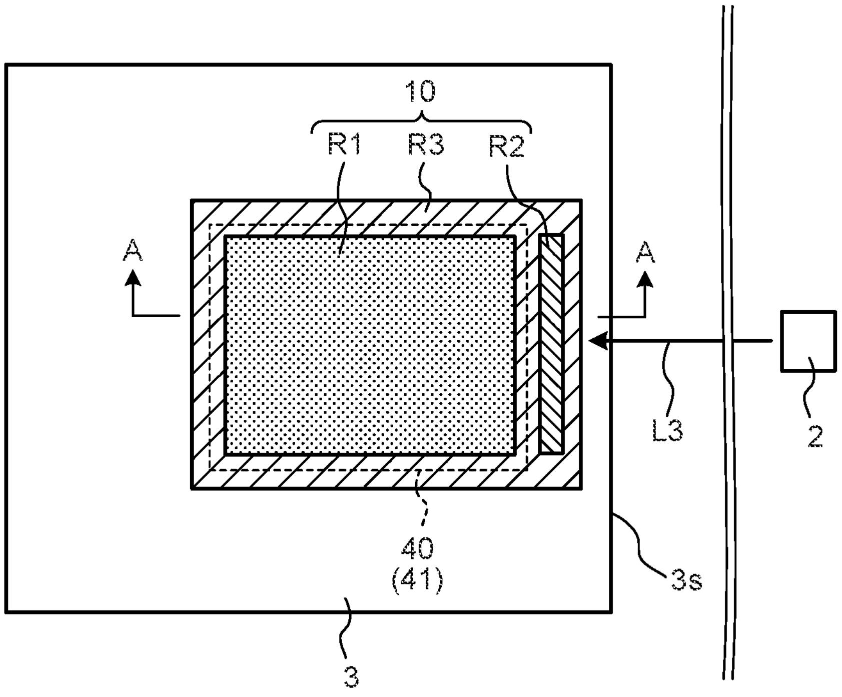
FIG. 9 is a plan view illustrating an example of arrangement of each pixel region in a pixel array unit in the distance measuring device according to the embodiment of the present disclosure.
Figure 10:
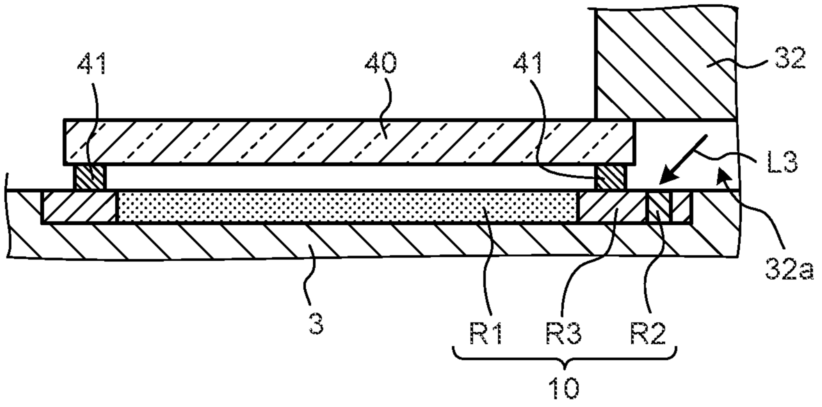
FIG. 10 is a cross-sectional view taken along line A-A illustrated in FIG. 9 as viewed in a direction of arrows.

FIG. 9 is a plan view illustrating an example of arrangement of each pixel region in the pixel array unit 10 in the distance measuring device 1 according to the embodiment of the present disclosure, and FIG. 10 is a cross-sectional view taken along line A-A illustrated in FIG. 9 as viewed in a direction of arrows.

As illustrated in FIG. 9, the pixel array unit 10 includes an effective pixel array R1, a reference pixel array R2, and a dummy pixel array R3. The effective pixel array R1 is a region in which the plurality of effective pixels 10*a* (see FIG. 6) described above are arranged in a two-dimensional lattice pattern.

The reference pixel array R2 is a region in which a plurality of reference pixels (not illustrated) is arranged side by side. The reference pixel is a pixel for receiving the reference light L3. In the embodiment, the pixel control unit 12 may measure the time when the reference light L3 is incident on the reference pixel. As a result, the time to (see FIG. 1), which is the time at which the luminescence element 2 produces luminescence, can be accurately evaluated.

In addition, in the embodiment, the pixel control unit 12 may start the operation of the SPAD included in the effective pixel array R1 using the output signal from the reference pixel. As a result, it is possible to suppress erroneous operation of the SPAD of the effective pixel 10*a* by light other than the emission light L1 before the emission light L1 (see FIG. 7) is emitted.

In addition, in the embodiment, the pixel control unit 12 may enable photon detection by the SPAD included in the effective pixel array R1 using the output signal from the reference pixel. As a result, it is possible to prevent the SPAD of the effective pixel 10*a* from erroneously detecting photons of light other than the emission light L1 before the emission light L1 (see FIG. 7) is emitted.

The dummy pixel array R3 is a region in which a plurality of dummy pixels (not illustrated) is arranged side by side. In the dummy pixel array R3, dummy pixels for suppressing process variation and deterioration of pixels near the boundary of the effective pixel array R1 or the reference pixel array R2 are arranged side by side.

Examples of such dummy pixels include process dummy pixels, on-chip lens (OCL) dummy pixels, or the like. The dummy pixel array R3 is disposed to surround the effective pixel array R1 and the reference pixel array R2.

Then, in the embodiment, the reference pixel array R2 may be disposed between the effective pixel array R1 and the luminescence element 2. As a result, the reference light L3 can be made incident on the reference pixel more preferentially than the effective pixel 10*a*. Therefore, according to the embodiment, it is possible to prevent the reference light L3 from leaking into the effective pixel 10*a*.

In addition, in the embodiment, as illustrated in FIG. 9, the long edge of the reference pixel array R2 is preferably positioned on the side of the luminescence element 2. As a result, it can be recognized in a plan view that the plurality of reference pixels in the reference pixel array R2 can be arranged as close as possible to the luminescence element 2, and the plurality of reference pixels in the reference pixel array R2 can be arranged as close as possible to the luminescence element 2.

In addition, in the embodiment, the reference pixel may be arranged at an end portion of the pixel array unit 10 on the side of the luminescence element 2. That is, in the embodiment, as illustrated in FIG. 9, the reference pixel array R2 may be arranged at an end portion of the pixel array unit 10 on the side of the luminescence element 2. In other words, in the embodiment, the reference pixel may be disposed closer to the luminescence element 2 than the effective pixel 10*a* in the pixel array unit 10.

As a result, the reference light L3 can be made incident on the reference pixel more preferentially than the effective pixel 10*a*. Therefore, according to the embodiment, it is possible to prevent the reference light L3 from leaking into the effective pixel 10*a*.

In addition, in the embodiment, as illustrated in FIG. 10 or the like, a band pass filter 40 is disposed above the effective pixel array R1 (that is, the plurality of effective pixels 10*a*) of the pixel array unit 10 to cover the effective pixel array R1. In the band pass filter 40, a transmission wavelength band is set to a peak wavelength (for example, 940 nm) of the emission light L1 (see FIG. 7) from the luminescence element 2.

As a result, it is possible to prevent light having a wavelength different from that of the reflection light L2 (see FIG. 7) having a wavelength substantially equal to that of the emission light L1 from entering the effective pixel 10*a*. Therefore, according to the embodiment, since noise caused by light having a wavelength different from that of the reflection light L2 can be reduced, the distance D to the object X can be accurately measured.

In addition, in the embodiment, the band pass filter 40 is preferably supported by a rib 41 disposed on the dummy pixel array R3 of the pixel array unit 10. The rib 41 is disposed, for example, on the surface of the dummy pixel array R3 positioned at the peripheral edge portion of the effective pixel array R1. That is, the effective pixel array R1 is positioned inside the rib 41 disposed in a rectangular shape, and the reference pixel array R2 is positioned outside the rib 41.

Then, in the embodiment, the rib 41 preferably has a light shielding property. That is, the rib 41 according to the embodiment preferably contains a material having a light shielding property. As a result, since the reference light L3 is blocked by the rib 41 having a light shielding property, it is possible to prevent the reference light L3 from leaking into the effective pixel array R1 (that is, the effective pixel 10*a*).

Therefore, according to the embodiment, since the noise caused by the reference light L3 leaking into the effective pixel 10*a* can be reduced, the distance D to the object X can be accurately measured.

In addition, in the embodiment, the rib 41 preferably contains a photosensitive adhesive. As a result, since the rib 41 can be formed using a photolithography technique, the rib 41 can be accurately arranged on the surface of the dummy pixel array R3 having a relatively narrow width.

In addition, the band pass filter 40 can be supported above the effective pixel array R1 without separately using an adhesive or the like. Therefore, according to the embodiment, since the supporting process of the band pass filter 40 can be simplified, the manufacturing cost of the distance measuring device 1 can be reduced.

In addition, in the embodiment, the rib 41 is preferably disposed on the dummy pixel array R3 (that is, on the plurality of dummy pixels). As a result, it is possible to prevent the effective pixel array R1 or the reference pixel array R2 from being covered by the rib 41, and thus, it is possible to suppress the light receiving region of the effective pixel array R1 or the reference pixel array R2 from being narrowed.

In addition, in the embodiment, the rib 41 may be arranged to surround the effective pixel array R1. As a result, it is possible to further prevent the reference light L3 from leaking into the effective pixel array R1 (that is, the effective pixel 10*a*).

Therefore, according to the embodiment, since the noise caused by the reference light L3 leaking into the effective pixel 10*a* can be further reduced, the distance D to the object X can be more accurately measured.

Figure 11:
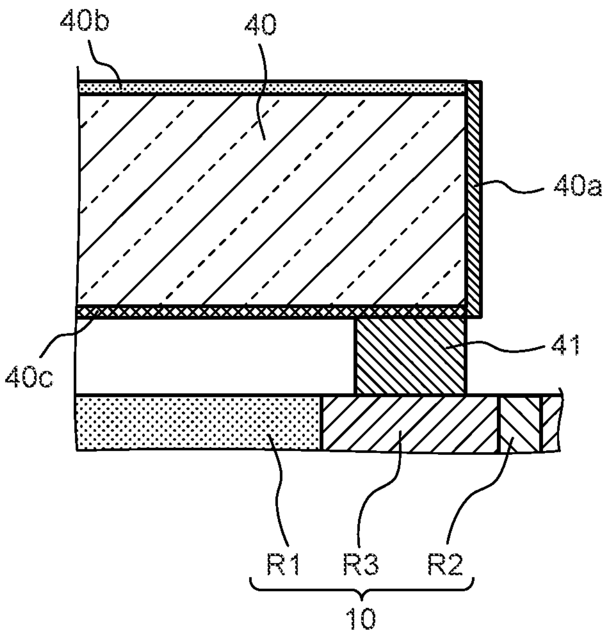
FIG. 11 is an enlarged cross-sectional view illustrating a configuration of a band pass filter and its vicinity according to the embodiment of the present disclosure.

FIG. 11 is an enlarged cross-sectional view illustrating a configuration of the band pass filter 40 and its vicinity according to the embodiment of the present disclosure. As illustrated in FIG. 11, a light shielding film 40*a*, an antireflection film 40*b*, and a band pass filter film 40*c* are provided on the surface of the band pass filter 40.

The light shielding film 40*a* is disposed on a side surface of the band pass filter 40 and has a light shielding property. The antireflection film 40*b* is disposed on the upper surface (that is, the surface on the side on which the reflection light L2 (see FIG. 7) is incident) of the band pass filter 40 and has an antireflection property.

The band pass filter film 40*c* is a film that is disposed on the bottom surface (that is, the surface on the side of the pixel array unit 10) of the band pass filter 40 and has a transmission wavelength band set to the peak wavelength of the emission light L1 (see FIG. 7) from the luminescence element 2.

Then, in the embodiment, since the reference light L3 (see FIG. 10) is blocked by the light shielding film 40*a* by disposing the light shielding film 40*a* on the side surface of the band pass filter 40, it is possible to further prevent the reference light L3 from leaking into the effective pixel array R1.

Therefore, according to the embodiment, since the noise caused by the reference light L3 leaking into the effective pixel 10*a* can be further reduced, the distance D to the object X can be more accurately measured.

In addition, in the embodiment, the antireflection film 40*b* is preferably provided in the band pass filter 40. As a result, since the amount of the reflection light L2 incident on the effective pixel array R1 can be increased, the distance D to the object X can be measured more accurately.

In addition, in the embodiment, as illustrated in FIG. 11 or the like, the band pass filter 40 is preferably not disposed above the reference pixel array R2 (that is, a plurality of reference pixels). As a result, it is possible to prevent the reference light L3 traveling toward the reference pixel from being blocked by the band pass filter 40.

In addition, in the embodiment, as illustrated in FIG. 10, the second housing 32 is preferably arranged above the rib 41 positioned between the effective pixel array R1 and the reference pixel array R2 to be in contact with the band pass filter 40.

As a result, it is possible to prevent the reference light L3 from going around from the upper surface of the band pass filter 40 and leaking into the effective pixel array R1. Therefore, according to the embodiment, since the noise caused by the reference light L3 leaking into the effective pixel 10*a* can be further reduced, the distance D to the object X can be more accurately measured.

[Various Modifications]

Next, various modifications of the distance measuring device 1 according to the embodiment will be described with reference to FIGS. 12 to 21.

<First Modification>

Figure 12:
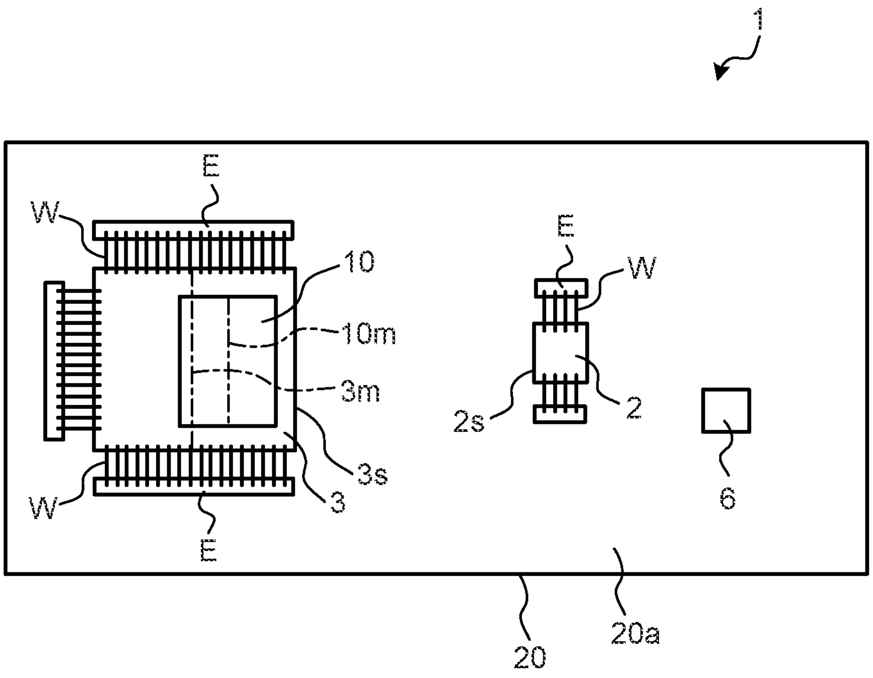
FIG. 12 is a plan view illustrating an example of a configuration of a distance measuring device according to a first modification of the embodiment of the present disclosure.

FIG. 12 is a plan view illustrating an example of a configuration of the distance measuring device 1 according to a first modification of the embodiment of the present disclosure. In first modification illustrated in FIG. 12, the arrangement of the pixel array unit 10 in the light receiving element 3 is different from that of the embodiment illustrated in FIG. 8.

Specifically, in the first modification, as illustrated in FIG. 12, the pixel array unit 10 is arranged in a manner that the long edge of the rectangular pixel array unit 10 faces the luminescence element 2, instead of the short edge. As a result, the center line 10*m* of the pixel array unit 10 provided in the light receiving element 3 can be disposed closer to the luminescence element 2 than the center line 3*m* of the light receiving element 3.

That is, in the first modification, the luminescence element 2 and the pixel array unit 10 of the light receiving element 3 can be further brought close to each other, in a manner that the base line length between the luminescence element 2 and the light receiving element 3 can be further shortened.

Therefore, according to the first modification, since the parallax between the luminescence element 2 and the light receiving element 3 can be further reduced, the distance D to the object X can be obtained more accurately.

<Second Modification>

Figure 13:
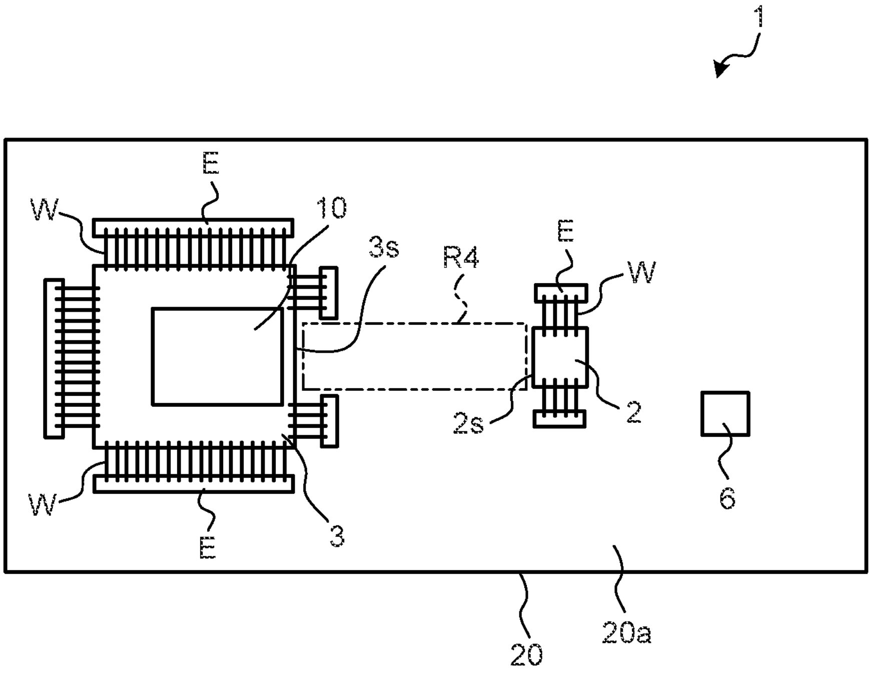
FIG. 13 is a plan view illustrating an example of a configuration of a distance measuring device according to a second modification of the embodiment of the present disclosure.

FIG. 13 is a plan view illustrating an example of a configuration of the distance measuring device 1 according to a second modification of the embodiment of the present disclosure. In the second modification illustrated in FIG. 13, the arrangement of the bonding wire W connected to the light receiving element 3 is different from that of the embodiment illustrated in FIG. 8.

Specifically, in the second modification, as illustrated in FIG. 13, the bonding wire W is also disposed on the edge 3*s* of the light receiving element 3 on the side of the luminescence element 2. On the other hand, in the second modification, the bonding wire W disposed on the edge 3*s* is lower in density than the bonding wire W disposed on an edge different from the edge 3*s*.

As described above, also by reducing the density of the bonding wire W disposed on the edge 3*s*, when the reference light L3 emitted from the luminescence element 2 travels toward the light receiving element 3, irregular reflection by the bonding wire W can be suppressed.

Therefore, according to the second modification, the reference light L3 in a favorable state can be received by the light receiving element 3.

In addition, in the second modification, the bonding wire W is preferably not disposed at a portion facing the luminescence element 2 on the edge 3*s* of the light receiving element 3 on the side of the luminescence element 2. That is, it is preferable that the bonding wire W is not disposed in a region R4 positioned between the portion facing the luminescence element 2 on the edge 3*s* and the luminescence element 2.

As a result, when the reference light L3 emitted from the luminescence element 2 travels toward the light receiving element 3, irregular reflection by the bonding wire W can be further suppressed. Therefore, according to the second modification, the reference light L3 in a more favorable state can be received by the light receiving element 3.

<Third Modification>

Figure 14:
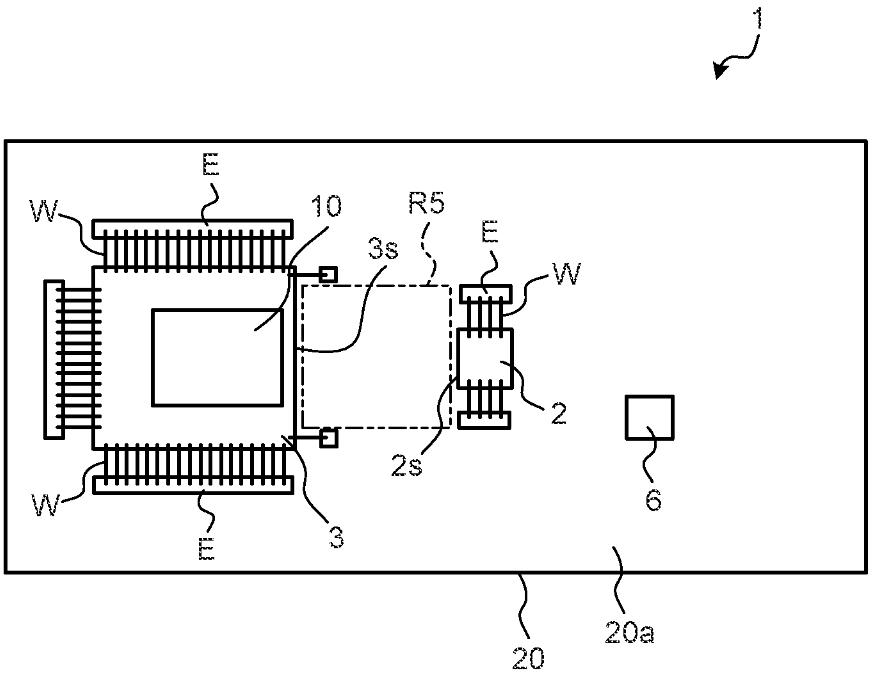
FIG. 14 is a plan view illustrating an example of a configuration of a distance measuring device according to a third modification of the embodiment of the present disclosure.

FIG. 14 is a plan view illustrating an example of a configuration of the distance measuring device 1 according to a third modification of the embodiment of the present disclosure. In the third modification illustrated in FIG. 14, the arrangement of the bonding wire W connected to the light receiving element 3 is different from that in the example of FIG. 13.

Specifically, in the third modification, the bonding wire W is not disposed in a portion of the edge 3*s* facing the luminescence element 2 and the bonding wire W connected to the luminescence element 2 or in a region R5 positioned between the luminescence element 2 and the bonding wire W connected to the luminescence element 2.

As a result, when the reference light L3 emitted from the luminescence element 2 travels toward the light receiving element 3, irregular reflection by the bonding wire W can be suppressed. Therefore, according to the third modification, the reference light L3 in a favorable state can be received by the light receiving element 3.

In addition, in the third modification, since the bonding wire W is not disposed in the region R5, the luminescence element 2 and the light receiving element 3 can be brought close to each other, in a manner that the base line length between the luminescence element 2 and the light receiving element 3 can be shortened.

Therefore, according to the third modification, since the parallax between the luminescence element 2 and the light receiving element 3 can be reduced, the distance D to the object X can be obtained accurately.

<Fourth Modification>

Figure 15:
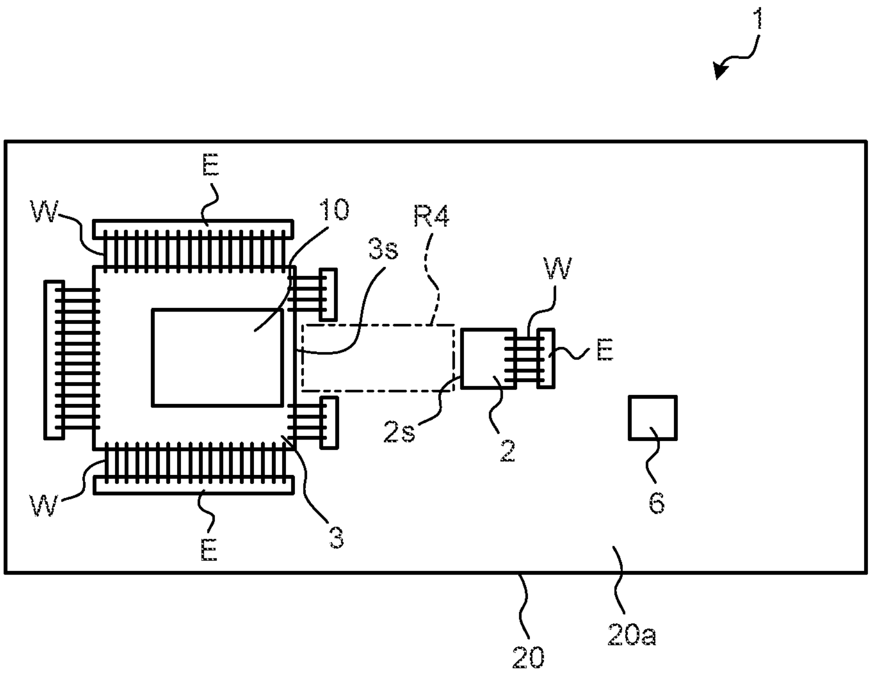
FIG. 15 is a plan view illustrating an example of a configuration of a distance measuring device according to a fourth modification of the embodiment of the present disclosure.

FIG. 15 is a plan view illustrating an example of a configuration of the distance measuring device 1 according to a fourth modification of the embodiment of the present disclosure. In the fourth modification illustrated in FIG. 15, the arrangement of the bonding wire W connected to the luminescence element 2 is different from that in the example of FIG. 13.

Specifically, in the fourth modification, as illustrated in FIG. 15, the bonding wire W is disposed only on the side of the luminescence element 2 opposite to the edge 2*s* on the side of the light receiving element 3.

As a result, when the reference light L3 emitted from the luminescence element 2 travels toward the light receiving element 3, irregular reflection by the bonding wire W can be suppressed. Therefore, according to the fourth modification, the reference light L3 in a favorable state can be received by the light receiving element 3.

In addition, in the fourth modification, the bonding wire W is not disposed in the region R4, and the bonding wire W is disposed only on the side of the luminescence element 2 opposite to the edge 2*s* on the side of the light receiving element 3, in a manner that the luminescence element 2 and the light receiving element 3 can be brought close to each other. As a result, the base line length between the luminescence element 2 and the light receiving element 3 can be shortened.

Therefore, according to the fourth modification, since the parallax between the luminescence element 2 and the light receiving element 3 can be reduced, the distance D to the object X can be obtained accurately.

<Fifth Modification>

Figure 16:
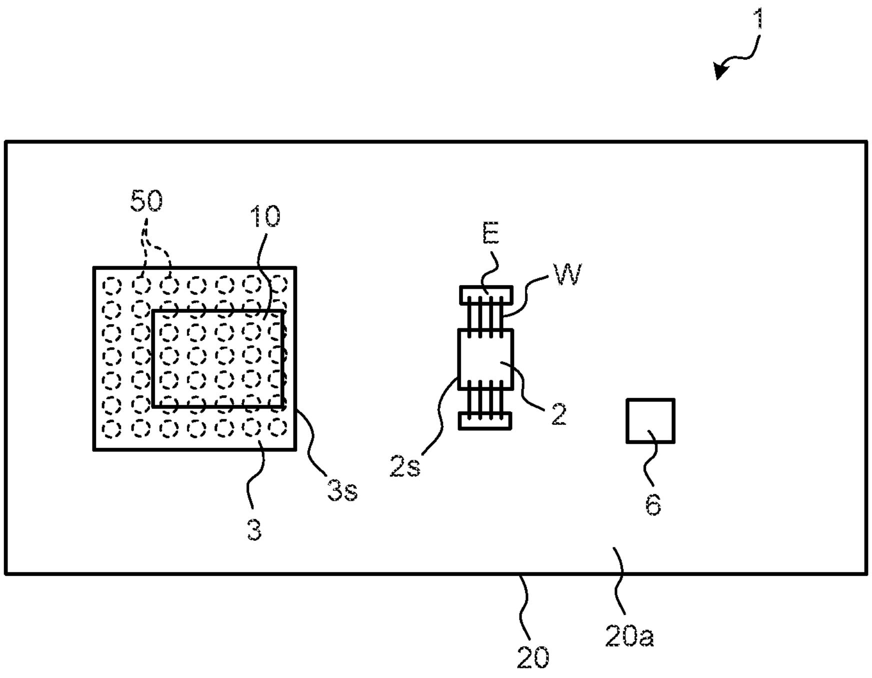
FIG. 16 is a plan view illustrating an example of a configuration of a distance measuring device according to a fifth modification of the embodiment of the present disclosure.

FIG. 16 is a plan view illustrating an example of a configuration of the distance measuring device 1 according to a fifth modification of the embodiment of the present disclosure. In the fifth modification illustrated in FIG. 16, a connection method between the light receiving element 3 and the substrate 20 is different from that of the embodiment illustrated in FIG. 8.

Specifically, in the fifth modification, as illustrated in FIG. 16, the light receiving element 3 and the substrate 20 are electrically connected to each other by a plurality of solder balls 50 arranged between the bottom surface of the light receiving element 3 and the front surface 20*a* of the substrate 20. That is, in the fifth modification, the light receiving element 3 has a chip size package (CSP) structure.

As a result, when the reference light L3 emitted from the luminescence element 2 travels toward the light receiving element 3, irregular reflection by the bonding wire W can be suppressed. Therefore, according to the fifth modification, the reference light L3 in a favorable state can be received by the light receiving element 3.

In addition, in the fifth modification, since the bonding wire W is not disposed in the region between the luminescence element 2 and the light receiving element 3, the luminescence element 2 and the light receiving element 3 can be brought close to each other, in a manner that the base line length between the luminescence element 2 and the light receiving element 3 can be shortened.

Therefore, according to the fifth modification, since the parallax between the luminescence element 2 and the light receiving element 3 can be reduced, the distance D to the object X can be obtained accurately.

<Sixth and Seventh Modifications>

Figure 17:
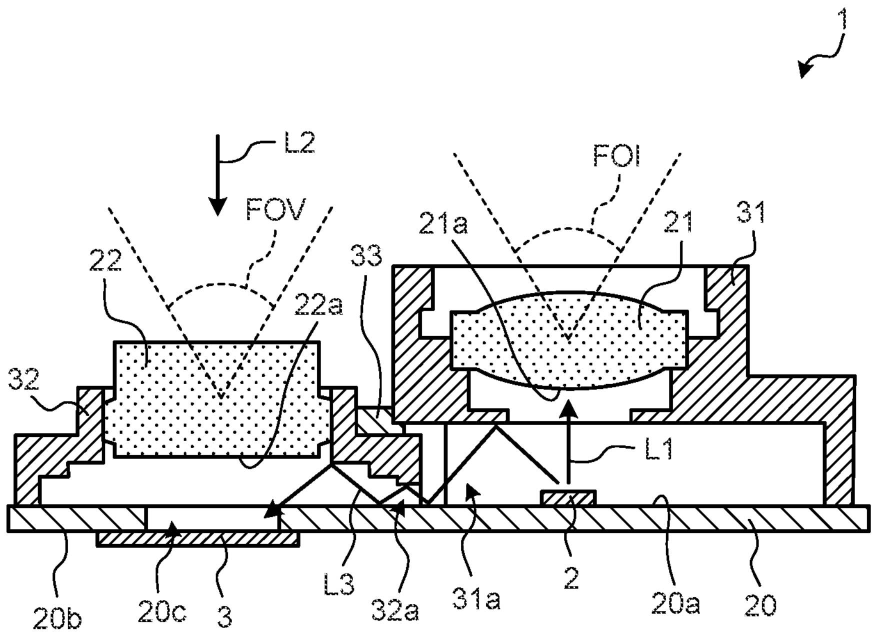
FIG. 17 is a cross-sectional view illustrating an example of a configuration of a distance measuring device according to a sixth modification of the embodiment of the present disclosure.

FIG. 17 is a cross-sectional view illustrating an example of a configuration of the distance measuring device 1 according to a sixth modification of the embodiment of the present disclosure. In the sixth modification illustrated in FIG. 17, the arrangement of the light receiving elements 3 on the substrate 20 and the substrate 20 is different from that of the embodiment illustrated in FIG. 7.

Specifically, in the sixth modification, as illustrated in FIG. 17, the substrate 20 has an opening portion 20*c* penetrating between the front surface 20*a* and a back surface 20*b*. Then, the luminescence element 2 is mounted on the front surface 20*a* of the substrate 20, and the light receiving element 3 has a flip-chip structure and is mounted on the back surface 20*b* of the substrate 20 to close the opening portion 20*c*.

Furthermore, in the sixth modification, the pixel array unit 10 (see FIG. 8) of the light receiving element 3 is arranged to be exposed to the side of the front surface 20*a* of the substrate 20 through the opening portion 20*c*, and receives the reflection light L2 through the second lens 22 and the opening portion 20*c*. Similarly, the pixel array unit 10 receives the reference light L3 via the opening portion 31*a*, the opening portion 32*a*, and the opening portion 20*c*.

With such a configuration, in the sixth modification, the luminescence element 2 and the light receiving element 3 can be brought close to each other, in a manner that the base line length between the luminescence element 2 and the light receiving element 3 can be shortened.

Therefore, according to the sixth modification, since the parallax between the luminescence element 2 and the light receiving element 3 can be reduced, the distance D to the object X can be obtained accurately.

Figure 18:
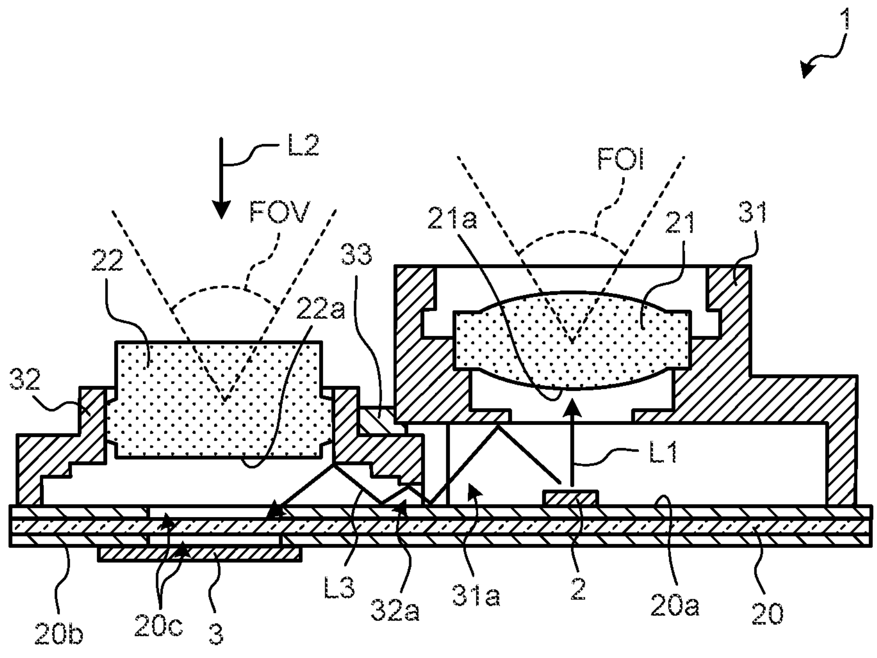
FIG. 18 is a cross-sectional view illustrating an example of a configuration of a distance measuring device according to a seventh modification of the embodiment of the present disclosure.

Note that the substrate 20 applicable to the sixth modification is not limited to the rigid substrate or the ceramic substrate. FIG. 18 is a cross-sectional view illustrating an example of a configuration of the distance measuring device 1 according to a seventh modification of the embodiment of the present disclosure. As illustrated in FIG. 18, the substrate 20 may be a through glass via (TGV).

Thus, similarly to the sixth modification, the reference light L3 in a favorable state can be received by the light receiving element 3. Furthermore, similarly to the sixth modification, the distance D to the object X can be accurately obtained.

In addition, the sixth modification and the seventh modification are not limited to the case where the light receiving element 3 has a flip-chip structure, and the light receiving element 3 and the substrate 20 may be electrically connected by a plurality of bonding wires W.

Then, in this case, when the reference light L3 emitted from the luminescence element 2 travels toward the light receiving element 3, irregular reflection by the bonding wire W can be suppressed.

This is because, even in a case where the light receiving element 3 and the substrate 20 are connected by the bonding wire W, the bonding wire W is disposed on the side of the back surface 20*b* of the substrate 20, whereas the reference light L3 does not reach the side of the back surface 20*b*. Therefore, in this case, the reference light L3 in a favorable state can be received by the light receiving element 3.

<Eighth Modification>

Figure 19:
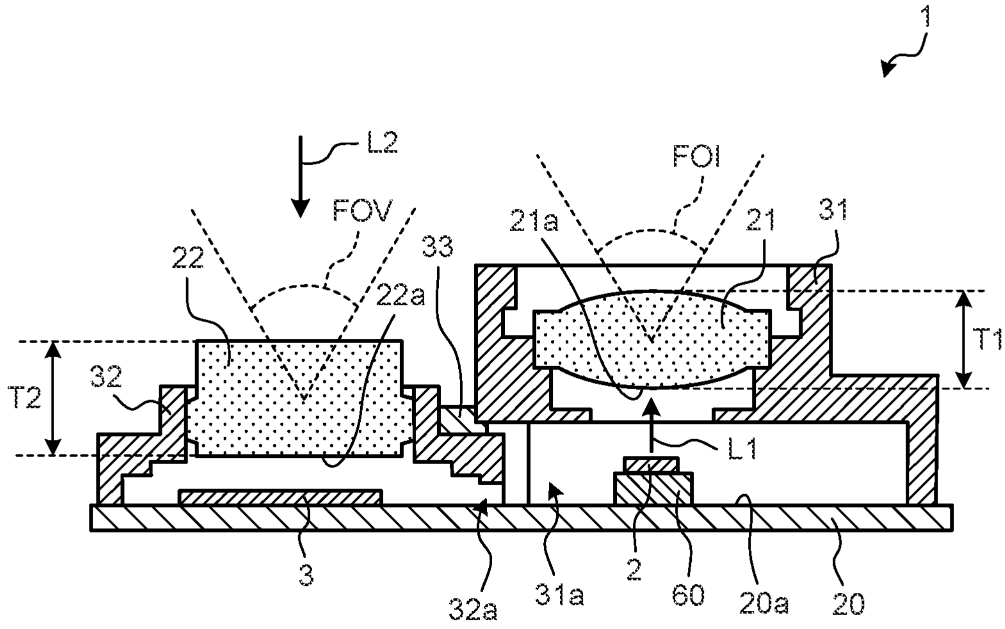
FIG. 19 is a cross-sectional view illustrating an example of a configuration of a distance measuring device according to an eighth modification of the embodiment of the present disclosure.

FIG. 19 is a cross-sectional view illustrating an example of a configuration of the distance measuring device 1 according to an eighth modification of the embodiment of the present disclosure. In the eighth modification illustrated in FIG. 19, the mounting position of the luminescence element 2 is different from that of the embodiment illustrated in FIG. 7.

Specifically, in the eighth modification, in a case where the thickness T1 of the first lens 21 is thinner than the thickness T2 of the second lens 22, the luminescence element 2, which is an element facing the first lens 21, which is the thinner lens, is mounted on the front surface 20*a* of the substrate 20 via a spacer 60.

That is, in the eighth modification, the luminescence element 2 facing the first lens 21, which is the thinner lens, is disposed at a higher position than the light receiving element 3 facing the second lens 22, which is the thicker lens.

As a result, since the irradiation range FOI of the thinner first lens 21 can be lifted as a whole, even in a case where the base line length between the luminescence element 2 and the light receiving element 3 is shortened, vignetting can be prevented from occurring in the irradiation range FOI by the second housing 32. That is, in the eighth modification, the base line length between the luminescence element 2 and the light receiving element 3 can be shortened.

Therefore, according to the eighth modification, since the parallax between the luminescence element 2 and the light receiving element 3 can be reduced, the distance D to the object X can be accurately obtained.

On the other hand, in a case where the thickness T2 of the second lens 22 is thinner than the thickness T1 of the first lens 21, the light receiving element 3, which is an element facing the second lens 22, which is the thinner lens, is preferably mounted on the front surface 20*a* of the substrate 20 via the spacer 60.

That is, in this case, the light receiving element 3 facing the second lens 22, which is the thinner lens, is preferably disposed at a higher position than the luminescence element 2 facing the first lens 21, which is the thicker lens.

As a result, since the visual field range FOV of the thinner second lens 22 can be lifted as a whole, even in a case where the base line length between the luminescence element 2 and the light receiving element 3 is shortened, vignetting can be prevented from occurring in the visual field range FOV by the first housing 31. That is, in the eighth modification, the base line length between the luminescence element 2 and the light receiving element 3 can be shortened.

Therefore, according to the eighth modification, since the parallax between the luminescence element 2 and the light receiving element 3 can be reduced, the distance D to the object X can be accurately obtained.

In addition, in the eighth modification, the spacer 60 is preferably made of a material having high thermal conductivity (for example, a metal material). As a result, heat generated at the time of driving the luminescence element 2 (or the light receiving element 3) can be efficiently released.

<Ninth Modification>

Figure 20:
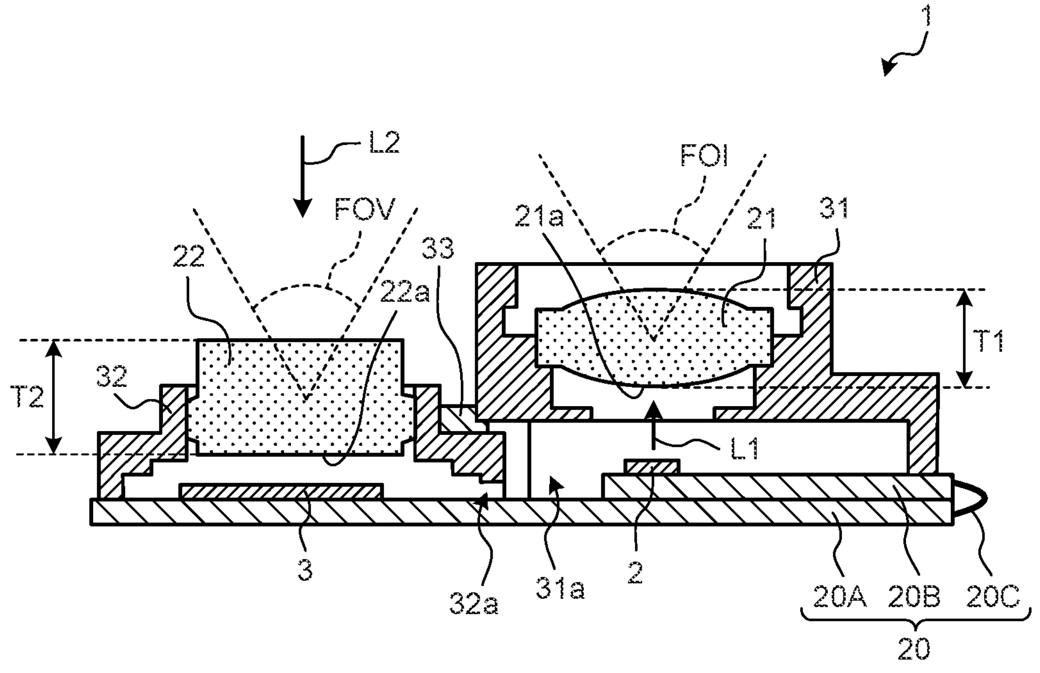
FIG. 20 is a cross-sectional view illustrating an example of a configuration of a distance measuring device according to a ninth modification of the embodiment of the present disclosure.

FIG. 20 is a cross-sectional view illustrating an example of a configuration of the distance measuring device 1 according to a ninth modification of the embodiment of the present disclosure. In the ninth modification illustrated in FIG. 20, the configuration of the substrate 20 is different from that of the eighth modification illustrated in FIG. 19.

Specifically, in the ninth modification, the substrate 20 is a rigid flexible substrate including rigid substrates 20A and 20B and a flexible substrate 20C. Then, in the ninth modification, in a case where the thickness T1 of the first lens 21 is thinner than the thickness T2 of the second lens 22, the rigid substrate 20B is disposed to overlap the rigid substrate 20A on the optical axis of the first lens 21, which is the thinner lens.

That is, in the ninth modification, the luminescence element 2 facing the first lens 21, which is the thinner lens, is raised by the rigid substrate 20B in a manner that the luminescence element 2 is disposed at a higher position than the light receiving element 3 facing the second lens 22, which is the thicker lens.

As a result, since the irradiation range FOI of the thinner first lens 21 can be lifted as a whole, even in a case where the base line length between the luminescence element 2 and the light receiving element 3 is shortened, vignetting can be prevented from occurring in the irradiation range FOI by the second housing 32. That is, in the ninth modification, the base line length between the luminescence element 2 and the light receiving element 3 can be shortened.

Therefore, according to the ninth modification, since the parallax between the luminescence element 2 and the light receiving element 3 can be reduced, the distance D to the object X can be obtained accurately.

On the other hand, in a case where the thickness T2 of the second lens 22 is thinner than the thickness T1 of the first lens 21, the rigid substrate 20B is preferably disposed to overlap the rigid substrate 20A on the optical axis of the second lens 22, which is the thinner lens.

That is, in this case, the light receiving element 3 facing the second lens 22, which is the thinner lens, is raised by the rigid substrate 20B in a manner that the light receiving element 3 is disposed at a higher position than the luminescence element 2 facing the first lens 21, which is the thicker lens.

As a result, since the visual field range FOV of the thinner second lens 22 can be lifted as a whole, even in a case where the base line length between the luminescence element 2 and the light receiving element 3 is shortened, vignetting can be prevented from occurring in the visual field range FOV by the first housing 31. That is, in the ninth modification, the base line length between the luminescence element 2 and the light receiving element 3 can be shortened.

Therefore, according to the ninth modification, since the parallax between the luminescence element 2 and the light receiving element 3 can be reduced, the distance D to the object X can be obtained accurately.

<10th Modification>

Figure 21:
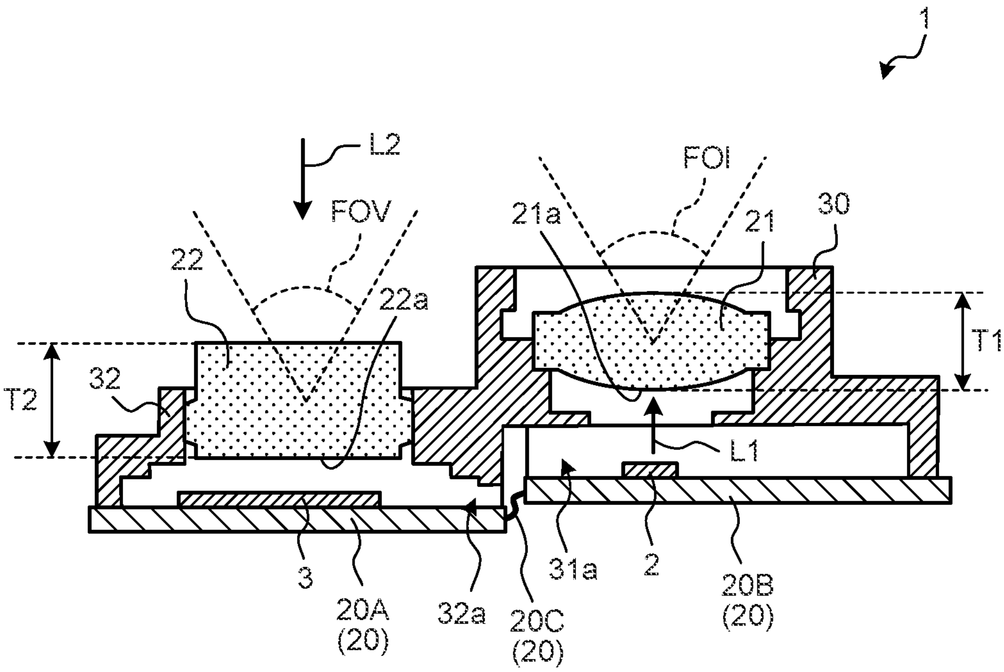
FIG. 21 is a cross-sectional view illustrating an example of a configuration of a distance measuring device according to a 10th modification of the embodiment of the present disclosure.

FIG. 21 is a cross-sectional view illustrating an example of a configuration of the distance measuring device 1 according to a 10th modification of the embodiment of the present disclosure. The 10th modification illustrated in FIG. 21 is different from the ninth modification illustrated in FIG. 20 in the configuration of the housing that holds the first lens 21 and the second lens 22.

Specifically, in the 10th modification, the first lens 21 and the second lens 22 are supported by a same housing 30. As described above, by holding both lenses in one housing 30, in the 10th modification, even in a case where the base line length between the luminescence element 2 and the light receiving element 3 is shortened, it is possible to prevent vignetting from occurring in the irradiation range FOI and the visual field range FOV by the housing 30.

This is because the housing 30, the first lens 21, and the second lens 22 can be further optimized and designed in a manner that vignetting does not occur in the irradiation range FOI and the visual field range FOV.

Furthermore, also in the 10th modification, similarly to the ninth modification or the like described above, in a case where the thickness T1 of the first lens 21 is thinner than the thickness T2 of the second lens 22, the luminescence element 2 is preferably disposed at a position higher than the light receiving element 3.

For example, as illustrated in FIG. 21, the rigid substrate 20B on which the luminescence element 2 is mounted is disposed at a position higher than the rigid substrate 20A on which the light receiving element 3 is mounted, in a manner the luminescence element 2 is disposed at a position higher than the light receiving element 3.

As a result, since the irradiation range FOI of the thinner first lens 21 can be lifted as a whole, even in a case where the base line length between the luminescence element 2 and the light receiving element 3 is shortened, vignetting can be prevented from occurring in the irradiation range FOI by the housing 30. That is, in the 10th modification, the base line length between the luminescence element 2 and the light receiving element 3 can be further shortened.

Therefore, according to the 10th modification, since the parallax between the luminescence element 2 and the light receiving element 3 can be further reduced, the distance D to the object X can be obtained more accurately.

On the other hand, in a case where the thickness T2 of the second lens 22 is thinner than the thickness T1 of the first lens 21, the rigid substrate 20A on which the light receiving element 3 is mounted is preferably disposed at a position higher than the rigid substrate 20B on which the luminescence element 2 is mounted, in a manner that the light receiving element 3 is preferably disposed at a position higher than the luminescence element 2.

As a result, since the visual field range FOV of the thinner second lens 22 can be lifted as a whole, even in a case where the base line length between the luminescence element 2 and the light receiving element 3 is shortened, vignetting can be prevented from occurring in the visual field range FOV by the first housing 31. That is, in the 10th modification, the base line length between the luminescence element 2 and the light receiving element 3 can be further shortened.

Therefore, according to the 10th modification, since the parallax between the luminescence element 2 and the light receiving element 3 can be further reduced, the distance D to the object X can be obtained more accurately.

[Effects]

The distance measuring device 1 according to the embodiment includes the luminescence element 2, the light receiving element 3, and the substrate 20. The luminescence element 2 irradiates the object X with light. The light receiving element 3 receives light from the luminescence element 2 reflected from the object X. The luminescence element 2 and the light receiving element 3 are mounted on the substrate 20. In addition, the bonding wire W electrically connecting the light receiving element 3 and the substrate 20 is not disposed on the edge 3*s* of the light receiving element 3 on the side of the luminescence element 2.

As a result, the reference light L3 in a favorable state can be received by the light receiving element 3.

In addition, the distance measuring device 1 according to the embodiment further includes a plurality of bonding wires W that electrically connects the light receiving element 3 and the substrate 20. Then, the bonding wire W is disposed on an edge different from the edge 3*s* of the light receiving element 3 on the side of the luminescence element 2.

As a result, the light receiving element 3 and the substrate 20 can be electrically connected well.

In addition, in the distance measuring device 1 according to the embodiment, the light receiving element 3 has a chip size package (CSP) structure.

As a result, the reference light L3 in a favorable state can be received by the light receiving element 3.

In addition, in the distance measuring device 1 according to the embodiment, the substrate 20 has the opening portion 20*c*, the luminescence element 2 is mounted on the front surface 20*a* of the substrate 20, and the light receiving element 3 is mounted on the back surface 20*b* of the substrate 20 to close the opening portion 20*c*.

As a result, the reference light L3 in a favorable state can be received by the light receiving element 3.

In addition, the distance measuring device 1 according to the embodiment includes the luminescence element 2, the light receiving element 3, the substrate 20, and the plurality of bonding wires W. The luminescence element 2 irradiates the object X with light. The light receiving element 3 receives light from the luminescence element 2 reflected from the object X. The luminescence element 2 and the light receiving element 3 are mounted on the substrate 20. The plurality of bonding wires W electrically connects the light receiving element 3 and the substrate 20. In addition, the bonding wire W disposed on the edge 3*s* of the light receiving element 3 on the side of the luminescence element 2 is lower in density than the bonding wire W disposed on an edge different from the edge 3*s* on the side of the luminescence element 2.

As a result, the reference light L3 in a favorable state can be received by the light receiving element 3.

In addition, in the distance measuring device 1 according to the embodiment, the bonding wire W is not disposed at a portion facing the luminescence element 2 on the edge 3*s* of the light receiving element 3 on the side of the luminescence element 2.

As a result, the reference light L3 in a favorable state can be received by the light receiving element 3.

In addition, in the distance measuring device 1 according to the embodiment, the bonding wire W electrically connecting the luminescence element 2 and the substrate 20 is not disposed on the edge 2*s* of the luminescence element 2 on the side of the light receiving element 3.

As a result, the reference light L3 in a favorable state can be received by the light receiving element 3.

In addition, in the distance measuring device 1 according to the embodiment, the mounting component 6 is not disposed in the region between the luminescence element 2 and the light receiving element 3.

As a result, the reference light L3 in a favorable state can be received by the light receiving element 3.

Although the embodiments of the present disclosure have been described above, the technical scope of the present disclosure is not limited to the above-described embodiments as it is, and various modifications can be made without departing from the gist of the present disclosure. In addition, components of different embodiments and modifications may be appropriately combined.

For example, the above embodiment illustrates the distance measuring device 1 to which the direct ToF method is applied, but the technology of the present disclosure may be applied to the distance measuring device 1 to which a so-called indirect ToF method is applied.

In addition, the effects described in the present specification are merely examples and are not limited, and other effects may be provided.

Note that the present technology can also have the configuration below.

(1)

A distance measuring device comprising:

a luminescence element that irradiates an object with light;

a light receiving element that receives light from the luminescence element reflected from the object; and a substrate on which the luminescence element and the light receiving element are mounted, wherein a bonding wire electrically connecting the light receiving element and the substrate is not disposed on an edge of the light receiving element on a side of the luminescence element.

(2)

The distance measuring device according to the above (1), further comprising:

a plurality of bonding wires electrically connecting the light receiving element and the substrate, wherein the bonding wire is disposed on an edge different from the edge of the light receiving element on the side of the luminescence element.

(3)

The distance measuring device according to the above (1), wherein the light receiving element has a chip size package (CSP) structure.

(4)

The distance measuring device according to the above (1), wherein the substrate has an opening portion, the luminescence element is mounted on a front surface of the substrate, and the light receiving element is mounted on a back surface of the substrate to close the opening portion.

(5)

A distance measuring device comprising:

a luminescence element that irradiates an object with light;

a light receiving element that receives light from the luminescence element reflected from the object;

a substrate on which the luminescence element and the light receiving element are mounted; and a plurality of bonding wires electrically connecting the light receiving element and the substrate, wherein the bonding wire disposed on an edge of the light receiving element on a side of the luminescence element is lower in density than the bonding wire disposed on an edge different from the edge on the side of the luminescence element.

(6) The distance measuring device according to the above (5), wherein the bonding wire is not disposed at a portion facing the luminescence element on the edge of the light receiving element on the side of the luminescence element.

(7)

The distance measuring device according to any one of the above (1) to (6), wherein a bonding wire electrically connecting the luminescence element and the substrate is not disposed on an edge of the luminescence element on a side of the light receiving element.

(8)

The distance measuring device according to any one of the above (1) to (7), wherein a mounting component is not disposed in a region between the luminescence element and the light receiving element.

REFERENCE SIGNS LIST

1 Distance measuring device
2 Luminescence element
3 Light receiving element
6 Mounting component
10 Pixel array unit
10*a* Effective pixel
12 Pixel control unit
20 Substrate
20*a* Front surface
20*b* Back surface
20*c* Opening portion
21 First lens
22 Second lens
31 First housing
32 Second housing
40 Band pass filter
40*a* Light shielding film
41 Rib
60 Spacer
L1 Emission light
L2 Reflection light
L3 Reference light
R1 Effective pixel array
R2 Reference pixel array
R3 Dummy pixel array
T1 to T2 Thickness
W Bonding wire

What is claimed is:

1. A distance measuring device, comprising:

a luminescence element that irradiates an object with light;

a light receiving element, wherein the light receiving element receives light from the luminescence element reflected from the object;

a substrate on which the luminescence element and the light receiving element are mounted; and an opening portion between the luminescence element and the light receiving element, wherein the light receiving element receives reference light from the luminescence element via the opening portion, and wherein a bonding wire electrically connecting the light receiving element and the substrate is not disposed in a path of the reference light in an area between the light receiving element and the luminescence element.

2. The distance measuring device according to claim 1, wherein the bonding wire is one of a plurality of bonding wires electrically connecting the light receiving element and the substrate, and wherein each bonding wire in the plurality of bonding wires is disposed on an edge different from the edge of the light receiving element on a side of the luminescence element.

3. The distance measuring device according to claim 1, wherein the light receiving element has a chip size package (CSP) structure.

4. A distance measuring device, comprising:

a luminescence element that irradiates an object with light;

a light receiving element that receives light from the luminescence element reflected from the object; and a substrate on which the luminescence element and the light receiving element are mounted, wherein a bonding wire electrically connecting the light receiving element and the substrate is not disposed on an edge of the light receiving element on a side of the luminescence element, wherein the substrate has an opening portion, wherein the luminescence element is mounted on a front surface of the substrate, and wherein the light receiving element is mounted on a back surface of the substrate to close the opening portion.

5. A distance measuring device, comprising:

a luminescence element that irradiates an object with light;

a light receiving element, wherein the light receiving element receives light from the luminescence element reflected from the object;

a substrate on which the luminescence element and the light receiving element are mounted;

a plurality of bonding wires electrically connecting the light receiving element and the substrate, wherein the bonding wires included in the plurality of bonding wires that are disposed on an edge of the light receiving element on a side of the luminescence element are lower in density than the bonding wires included in the plurality of bonding wires that are disposed on an edge different from the edge on the side of the luminescence element; and an opening portion between the luminescence element and the light receiving element, wherein the light receiving element receives reference light from the luminescence element via the opening portion.

6. A distance measuring device, comprising:

a luminescence element that irradiates an object with light;

a light receiving element, wherein the light receiving element that receives light from the luminescence element reflected from the object;

a substrate on which the luminescence element and the light receiving element are mounted; and a plurality of bonding wires electrically connecting the light receiving element and the substrate, wherein the bonding wires included in the plurality of bonding wires that are disposed on an edge of the light receiving element on a side of the luminescence element are lower in density than the bonding wires included in the plurality of bonding wires that are disposed on an edge different from the edge on the side of the luminescence element, wherein the bonding wires are not disposed at a portion facing the luminescence element on the edge of the light receiving element on the side of the luminescence element.

7. The distance measuring device according to claim 1, wherein a bonding wire electrically connecting the luminescence element and the substrate is not disposed on an edge of the luminescence element on a side of the light receiving element.

8. The distance measuring device according to claim 1, wherein a mounting component is not disposed in a region between the luminescence element and the light receiving element.

* * * * *